United States Patent [19]

Palusamy et al.

[11] Patent Number: 4,908,775
[45] Date of Patent: Mar. 13, 1990

[54] CYCLE MONITORING METHOD AND APPARATUS

[75] Inventors: Sam S. Palusamy, Murrysville; John C. Schmertz, Pittsburgh; Dali Li, Monroeville; John N. Chirigos, Churchill; Charles B. Bond, Plum Borough; Chuang Y. Yang, Murrysville, all of Pa.

[73] Assignee: Westinghouse Electric Corp., Pittsburgh, Pa.

[21] Appl. No.: 18,379

[22] Filed: Feb. 24, 1987

[51] Int. Cl.$^4$ ............... G21C 17/00; G06F 15/74
[52] U.S. Cl. ............... 364/508; 364/551.01; 376/249
[58] Field of Search ............... 364/179, 178, 577, 492, 364/508, 507, 551.01; 376/245, 216, 249, 250

[56] References Cited

U.S. PATENT DOCUMENTS

| Re. 31,247 | 5/1983 | Johnstone | 364/474.19 |
|---|---|---|---|
| 3,266,023 | 8/1966 | Werme | 364/200 |
| 3,818,474 | 6/1974 | Kurner et al. | 340/721 |
| 3,873,817 | 3/1975 | Liang | 376/245 |
| 3,950,985 | 4/1976 | Buchwald et al. | 364/507 |
| 4,236,220 | 11/1980 | Kogami et al. | 364/504 |
| 4,298,955 | 11/1981 | Munday et al. | 364/900 |
| 4,318,778 | 3/1982 | Musick | 376/216 |
| 4,336,595 | 6/1982 | Adams et al. | 364/508 |
| 4,517,468 | 5/1985 | Kemper et al. | 290/52 |
| 4,581,196 | 4/1986 | Sakagami et al. | 376/216 |
| 4,608,223 | 8/1986 | Twilley | 376/247 |
| 4,632,802 | 12/1986 | Herbst et al. | 376/216 |
| 4,657,727 | 4/1987 | Mlynczak et al. | 376/217 |
| 4,660,152 | 4/1987 | Downing et al. | 364/179 |
| 4,678,622 | 7/1987 | Rowe et al. | 376/259 |
| 4,761,748 | 8/1988 | Le Rat et al. | 364/551 |

FOREIGN PATENT DOCUMENTS 1476937  6/1977  United Kingdom ............... 376/216

OTHER PUBLICATIONS

Hutin & Churier, "Verification of Design Analysis Conditions in Operating PWR Plants", Nuclear Engineering Design, V. 81 (1984), pp. 139–144, No. 1 (reprint) North–Holland Physics Publishing—Amsterdam.

Khandheria et al., "Adaptive Sampling Increases Sampling Rate as Process Derivations Increase", pp. 33–35, Control Engineering, Feb. 1977, vol. 24, No. 2.

(List continued on next page.)

Primary Examiner—Felix D. Gruber
Assistant Examiner—S. A. Melnick
Attorney, Agent, or Firm—D. C. Abeles

[57] ABSTRACT

The present invention is a cycle monitoring system and method that acquires, logs and analyzes analog and/or digital signals from component sensors in a process control plant such as a nuclear power plant. The system continuously monitors the sensors and records steady-state and transient phenomena. Compression of the data is performed to reduce storage load. The compression ratio for transient data is driven by a threshold indicating a measurement signficant to stress determination. Transient data is retained at a higher sampling rate, so that the parameters of transient such as the maximum value can be determined for stress analysis. The stress analysis determines pressure and thermal stresses which are used to calculate a usage factor which indicates the stress age and thus the remaining life of a component. The system provides estimates of fatigue accumulation associated with selected locations of critical power plant components. Measurements of plant process and response parameters are used to provide data for calculation of fatigue accumulation. The system includes a computer containing a database that includes thresholds and response characteristics of the plant components to varying types of stress. The process required to calculate fatigue for monitored components and locations uses Duhamels integral to calculate transient stress, combines the transient stress with other stresses to produce a usage factor from stress ranges designating when a stress cycle has occurred. The system can be used to plan routine maintenance, repair and replacement decision, and to justify alternative plant operation modes and life extension.

13 Claims, 24 Drawing Sheets

OTHER PUBLICATIONS

Baylac et al., "Improvements in the Design and Operation of French PWRs by Transital", ENC 4 FORATOM IX, Geneva, Jun. 1-6, 1986, pp. 1-8 and 138-144.

"Fatigue Monitoring System (FAMOS)", KWU, May, 1986, (printed in Germany).

Section III, "Rules for Construction of Nuclear Power Plant Components", Div.-1—Subsection NB, Class 1 Components, 1986 edition, Jul. 1, 1986, pp. 49-70.

Courant et al., "Methods of Mathematical Physics", vol. I, Interscience Publishers, New York, 1953, pp. 351-376.

Roark et al., "Formulas for Stress and Strain", (Fifth ed.), McGraw-Hill, Inc., Copyright 1975, pp. 582-586.

Hildebrand, "Advanced Calculus for Applications", Prentice-Hall, 1976, pp. 451-453.

Cox et al., "Plant Enhancement & Life Extension—A Multi-Unit Perspective for Southern Calif.", Edison's San Onofre Nuclear Generating Station, Jun., 1985, pp. 1-18.

Shigley, "Mechanical Engineering Design", Third ed., McGraw-Hill Co., Copyright 1977, 1972, 1963, pp. 60-63.

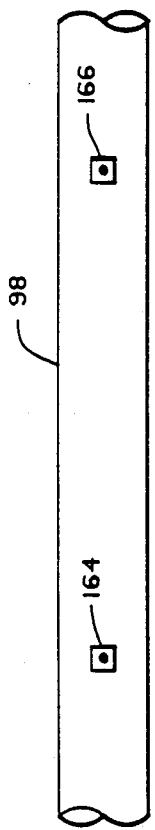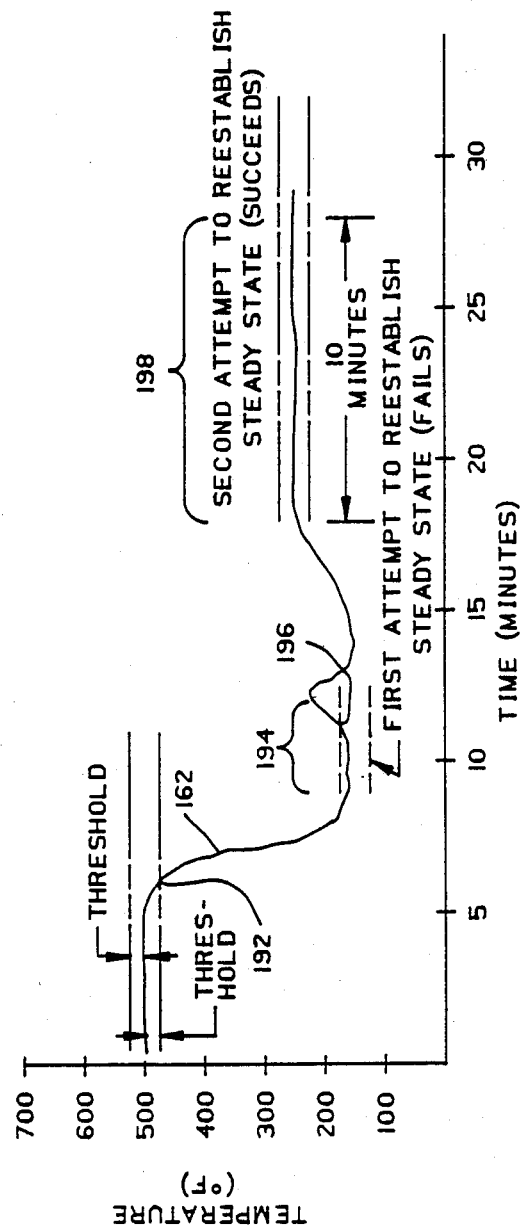

TRANSIENT SAMPLE

FATIGUE CURVE

TRANSIENT

TRANSIENT

CYCLE MONITORING METHOD AND APPARATUS

BACKGROUND OF THE INVENTION

1. Field of the Invention

This invention is directed to a method and apparatus for monitoring and analyzing, on an on-line basis, the fatigue accumulated by components and systems subjected to fluid flow, thermal and pressure transients, particularly nuclear power plant components and systems. More particularly, the invention is directed to presenting to plant engineers a representation of the margin between current fatigue accumulation and a value of fatigue accumulation that indicates repair, when replacement or refurbishment of the component or system is necessary. The invention also encompasses techniques for providing accurate determination of stresses at plant locations critical to fatigue, the determination being made through measurements of plant process and response parameters.

2. Description of the Related Art

Components in a nuclear power plant are subjected throughout their 40 year nominal life to stresses induced by changes in process fluid temperature and pressure. It is necessary for the operators and engineers of a nuclear power plant to be constantly aware of the status of critical plant components and systems with respect to fatigue. Presently, this is done by the following means: measurements of plant process and response parameters (temperature, pressure, flow, level, valve status, setpoint status, for example) are measured and the data is recorded by a plant computer. This data is used by plant engineers to make subjective judgments regarding certain types of transients. The types of transients that must be recorded are specified in the plant technical specifications, which are overseen by the U.S. Nuclear Regulatory Commission (NRC). The technical specifications allow a specified number of each type of transient during the 40-year life. The prior art methods do not perform fatigue calculations to determine changes in life expectancy, but make educated guesses concerning when a component should be removed from service based on the conservative transient counts allowed by regulators and subjective determinations, by engineers, as to whether a particular transient should be counted. The transients in a nuclear power plant fall into two general categories; normal transients which occur during plant start-up and plant power output demand changes and abnormal transients which occur when a plant component or system is functioning abnormally. If the allowable number for one or more transients is exceeded, justification must be provided to the NRC as to why the plant is safe for continued operation. This may include revision of the stress analysis which formed the original design basis for the plant.

SUMMARY OF THE INVENTION

It is an object of the present invention to facilitate decisions regarding electric power plant life extension.

It is another object of this invention to provide a systematic method and apparatus for accurately measuring fatigue in critical plant components due to all significant thermal and pressure transients.

It is an additional object of the present invention to compile a database that can be used in support of utility requests to regulatory authorities for permission to extend the operating life of electric power plants or used to eliminate the requirements for counting plant cycles.

It is also an object of the present invention to provide a systematic method and apparatus for monitoring critical plant parameters and for compiling a database for maintenance, repair and replacement decisions for critical plant components.

It is an additional object of the present invention to provide a systematic method and apparatus for monitoring critical plant parameters and for compiling a database that can be used to justify non-design basis operating modes in order to provide maximum plant flexibility and optimization of plant operation.

The above objects can be attained by a system and method that acquires, logs and analyzes analog and/or digital signals from component sensors in a process control plant such as a nuclear power plant. The system continuously monitors the sensors and records steady-state and transient phenomena. Compression of the steady state data is performed to reduce the storage load. Transient data is recorded at a higher sampling rate, so that the parameters of the transients, such as the maximum value, can be determined for stress analysis. The stress analysis determines pressure and thermal stresses which are used to calculate a usage factor which indicates the stress age and thus the remaining life of a component.

These together with other objects and advantages which will be subsequently apparent, reside in the details of construction and operation as more fully hereinafter described and claimed, reference being made to the accompanying drawings forming a part hereof, wherein like numerals refer to like parts throughout.

BRIEF DESCRIPTION OF THE DRAWINGS

FIG. 1, including

FIG. 2, including

FIG. 3, including

FIG. 4, including

FIG. 5 is a sketch of a typical component showing monitored and unmonitored/undermonitored locations for a typical transient;

FIG. 6 is an example of a temperature transient;

FIG. 7, including

FIG. 9, including

DESCRIPTION OF THE PREFERRED EMBODIMENT

The present invention preferably uses a dedicated minicomputer for all data acquisition, computation and analysis activities. However, the system could be implemented on an already existing computer at the plant, if that computer had adequate data acquisition and computation capability. The description is directed to calculating fatigue at specific locations in a nuclear power plant, however, this method and system can be used for calculation of fatigue crack growth. The changes necessary to incorporate fatigue crack growth can be performed by one of ordinary skill in the art based on Hertzberg, R. W., *Deformation and Fracture Mechanics of Engineering Materials*, John Wiley and Sons, 1976, incorporated by reference herein. The apparatus and methods described herein are not limited to nuclear power plants, but can be applied to any process plant, or even individual components or systems subject to fatigue loadings due to fluid flow, thermal and pressure transients.

Figure 1A:
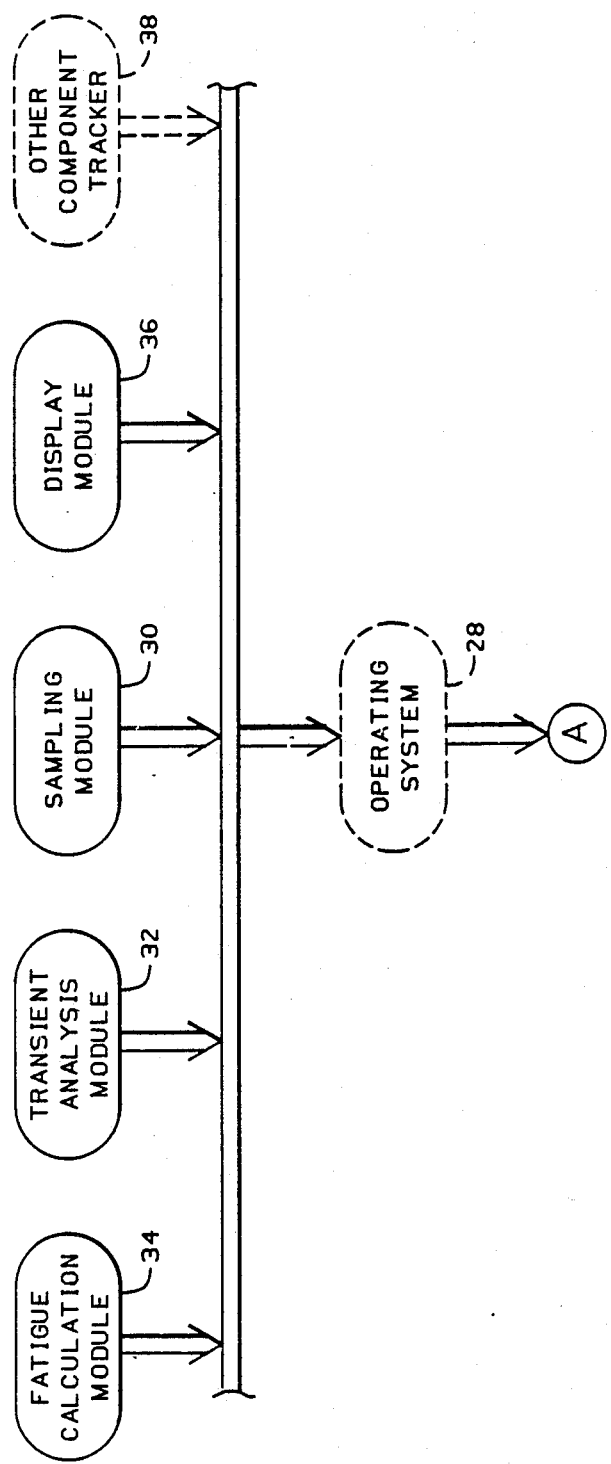
FIGS. 1A and 1B, is a functional hardware and software block diagram of the present invention.
Figure 1B:
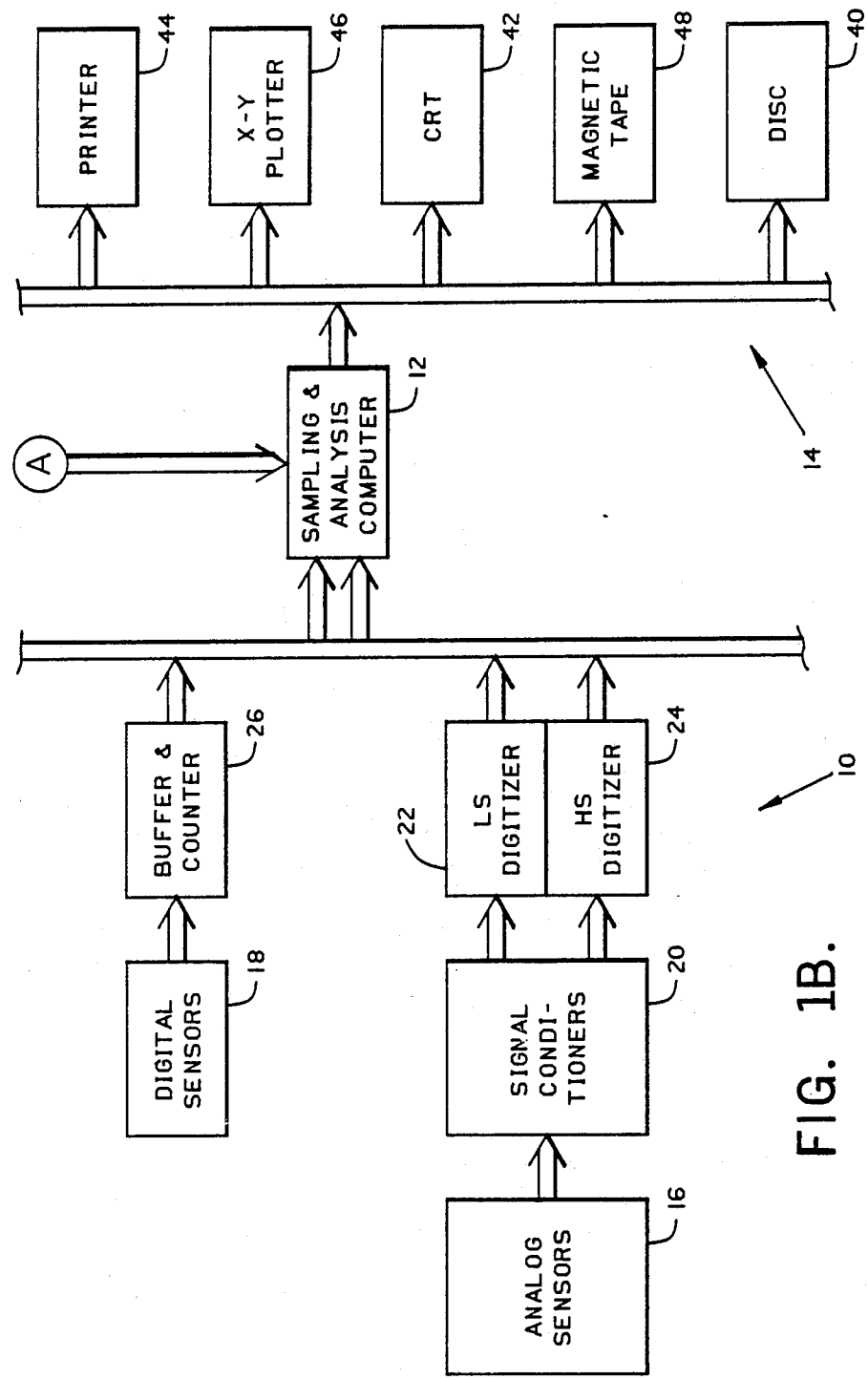

FIG. 1 is a functional block diagram of the preferred embodiment of the integrated hardware and software of the invention. The hardware portion of the system consists of a signal input section 10, a sampling and analysis computer 12 and a set of output peripherals 14. It is possible to substitute a slower speed computer for the sampling and analysis computer 12 if only sampling is performed and to provide a separate remotely located analysis computer. The input section 10 provides pressure, temperature and fluid flow data produced by plant analog sensors 16 and/or digital sensors 18, typically found in nuclear power plants. These sensors 16 and 18 sense the process signals and response parameters for the components and locations being monitored. Analog signals produced by the analog sensors 16 are processed through signal conditioners 20, which include a sensor signal multiplexer for selecting a single sensor signal at a time. The signal conditioners 20 are also typically found in nuclear power plants, and convert the sensor signals to the 0 to 10 volt signals required by digitizers 22 and 24. The analog signals proceed either to the low speed digitizer 22 or the high speed digitizer 24, depending on the frequency of the signals. Suitable digitizers 22 and 24 are available from Tustin as model number X1500. The decision to use the low speed digitizer 16 or the high speed digitizer 14 for a given input signal is made by the design engineer when the system is installed depending on the highest frequency expected from the sensor. The high speed digitizer 24 has a variable capacity with a typical sampling rate of about 200,000 samples per second. Digital signals are produced by the digital sensors 18 and processed through a buffer and counter unit 26 such as a digital input/output board, available as a discrete isolated input-card model 1585 from Tustin. The function of the buffer and counter unit is to determine the location of the signal and whether it is on or off (one or zero). Once the signals are processed through the buffer and counter unit 26 in the case of digital signals, or through the low speed digitizer 22 or high speed digitizer 24 in the case of analog signals, the signals are properly digitized and ready for input into the computer 12. The host computer 12 is preferably a Data General Computer model MV-4000 having at least two megabytes of main memory and a running real time virtual operating system 28 such as Data General's OSVS operating system. This system will handle up to 100 channels of sensor data, if more channels are needed, a faster and bigger computer will be necessary. The real time operating system 28 acts as the manager and causes loading of appropriate software modules 30–38. The real time operating system 28 also controls the link between the computer 12 and the output peripherals 14. The output peripherals 14 include typical units associated with minicomputers and are available from Data General such as a 300 megabyte disk drive 40 for short term data storage, a cathode ray tube 42 or a printer 44 for outputting results of fatigue analysis, a plotter 46 for showing changes in component life expectancy and a magnetic tape unit 48 for archival data storage.

Figure 2A:
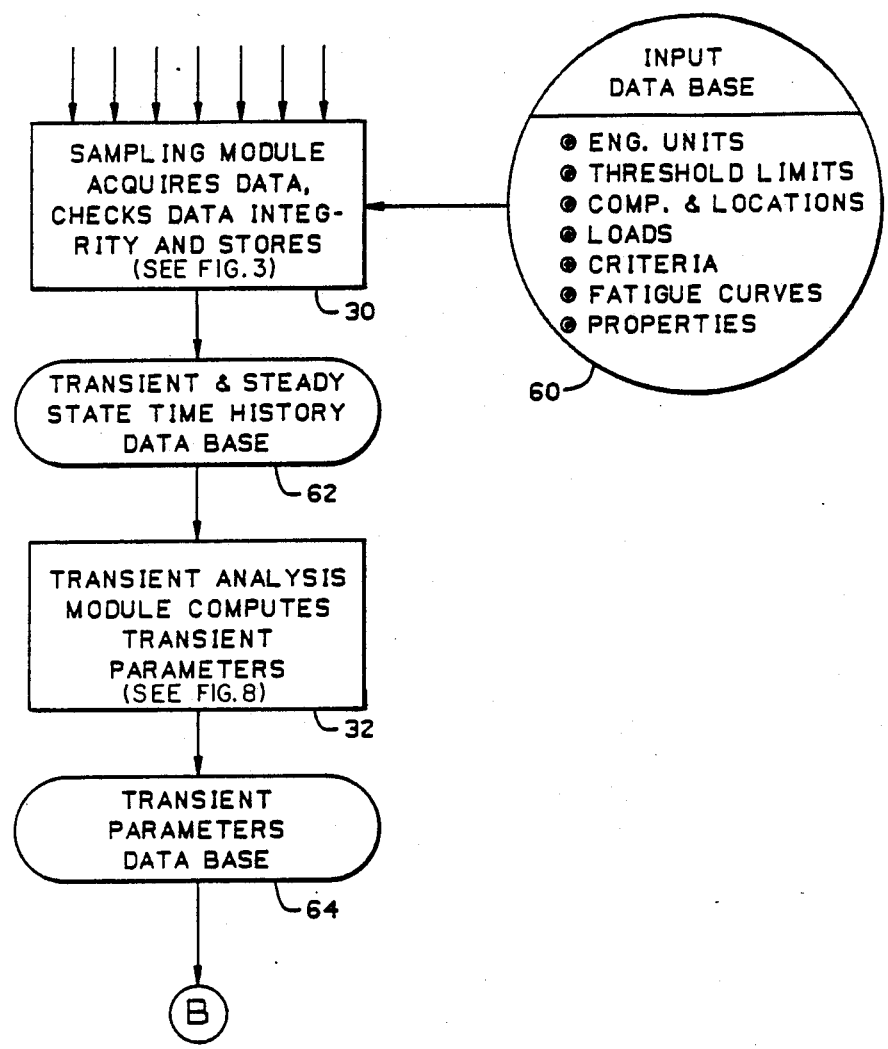
FIGS. 2A and 2B, is a flowchart showing the relationship between the software modules of the system.
Figure 2B:
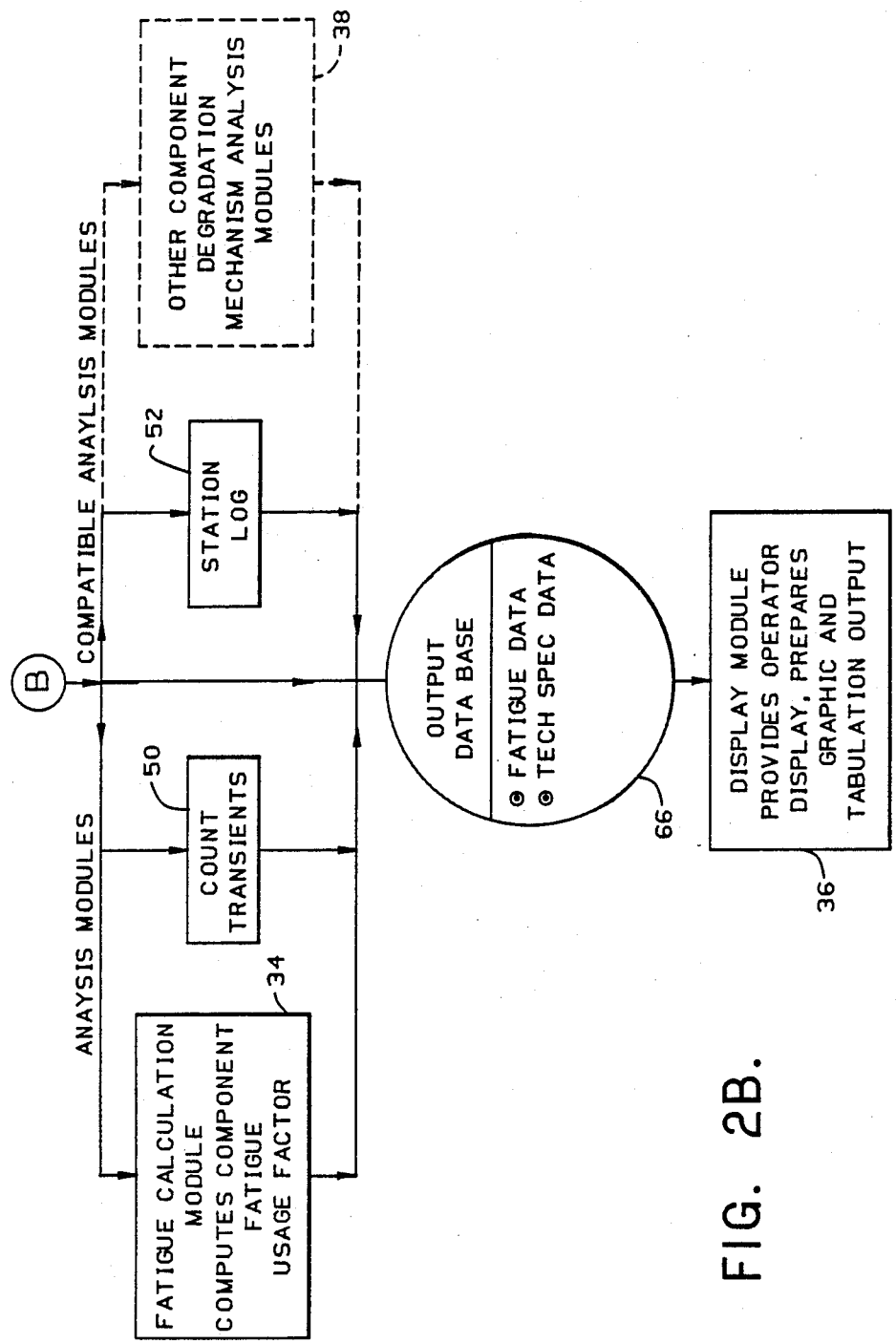

The software is modular and expandable such that other component tracker modules 38 can be added as required. Other component tracker modules can be based on fatigue crack growth, or any other technically valid theoretical construct for determination of accumulated fatigue, including automated technical specification transient cycle counting. The preferred embodiment illustrates application of the system using fatigue usage factor methodology. A flowchart showing the relationship between the software modules 30–36, is shown in FIG. 2. The sampling module 30 can be considered the manager of the input section 10 in FIG. 1. The sampling module 30, discussed in detail with respect to FIGS. 3–7, combines an input data base 60 (residing in computer 12) with the input signals into a data structure such as array, then performs a data integrity check. The input database 60 contains: engineering units for converting the sensor samples into pressure, temperature, etc.; threshold limits that determine when a transient has occurred, requiring fatigue analysis; component identification information, including sensor locations, ranges, etc.; loads, such as pipe dead weight and seismic loads; fatigue curves depicting the effect of stress levels on fatigue; stress kernels which describe the stress response of a component to a unit change in a process parameter such as temperature or pressure; and materials properties. The sampling module 30 stores the data in a predetermined size transient and steady state time history database 62. The transient and steady state time history database 62, when full, is used as input to the transient analysis module 32, discussed in detail with respect to FIGS. 9 and 10. The module 32 computes transient parameters that result in compilation of a transient parameter database 64. The transient parameter database 64 provides the input required for the fatigue calculation software module 34, discussed in detail with respect to FIGS. 11–15. Module 34 which computes the component fatigue usage factor for each component and location being monitored and provides the relevant fatigue data to an output database 66. The display software module 36 provides provisions for operator display. The display module 36 outputs component names, locations and remaining life information using tabular representations, graphs and other data representation schemes useful to plant operators. The display module 36 will not be discussed in detail herein, since the production of a suitable display depends on operator preference, plant design, etc., and can be provided by one of ordinary skill in the art.

Modules 50 and 52 are other possible modules that can count transients by merely keeping a count of the transients that a component experiences or simply logging the transients and operating information for operator and engineering reference.

Figure 3A:
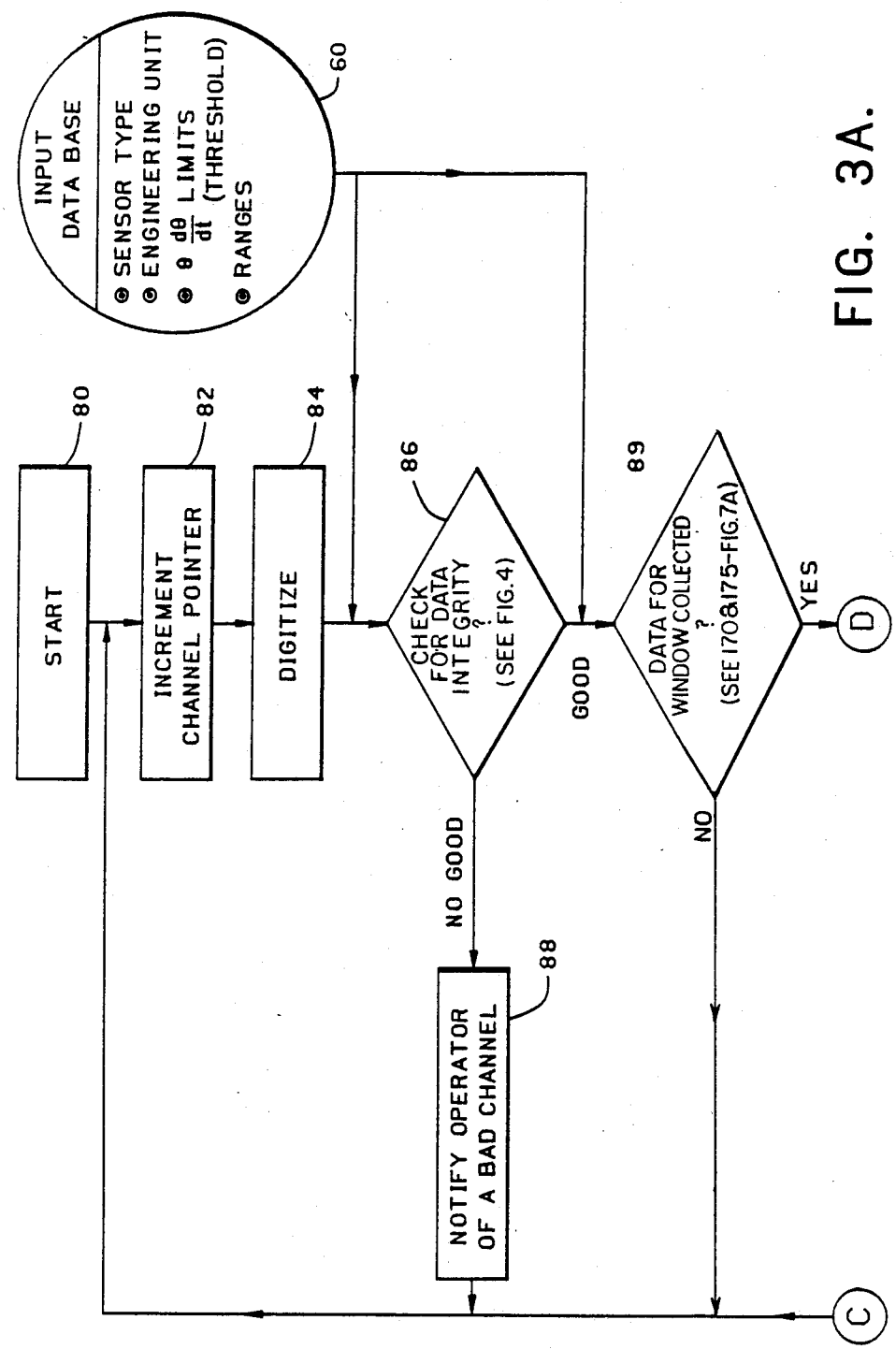
FIGS. 3A and 3B, is a flowchart of the data acquisition module 30.
Figure 3B:
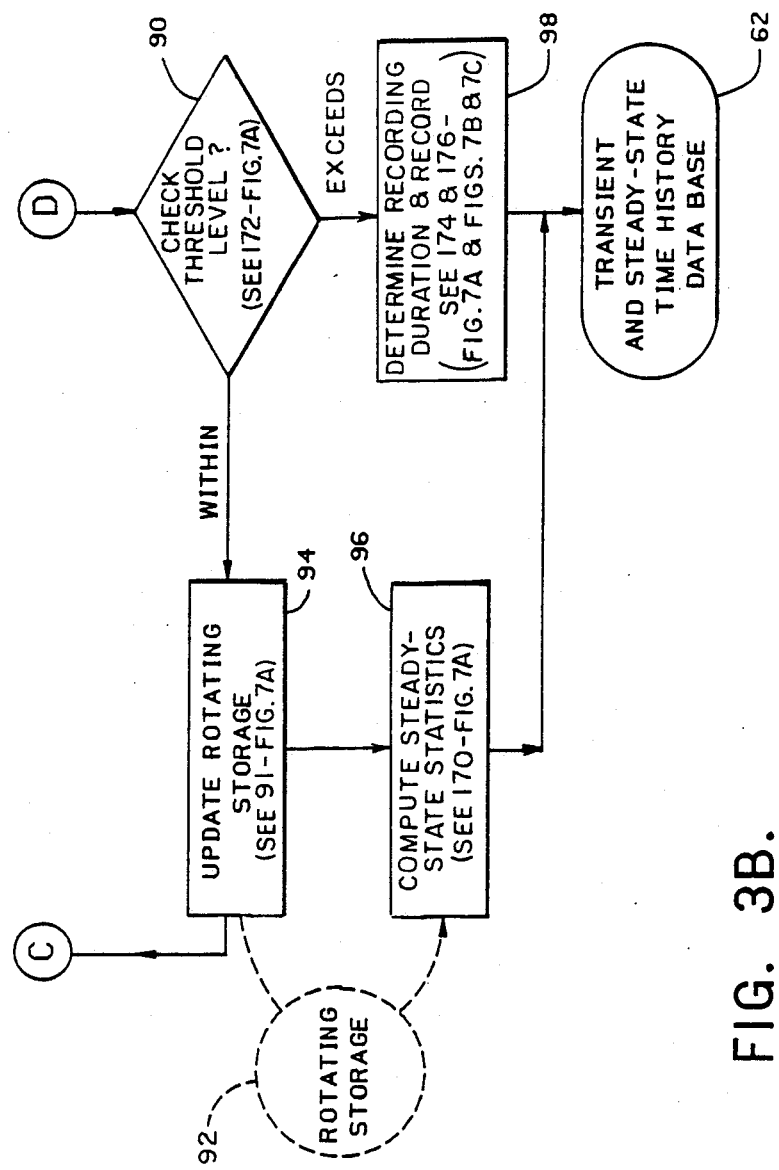
Figure 4A:
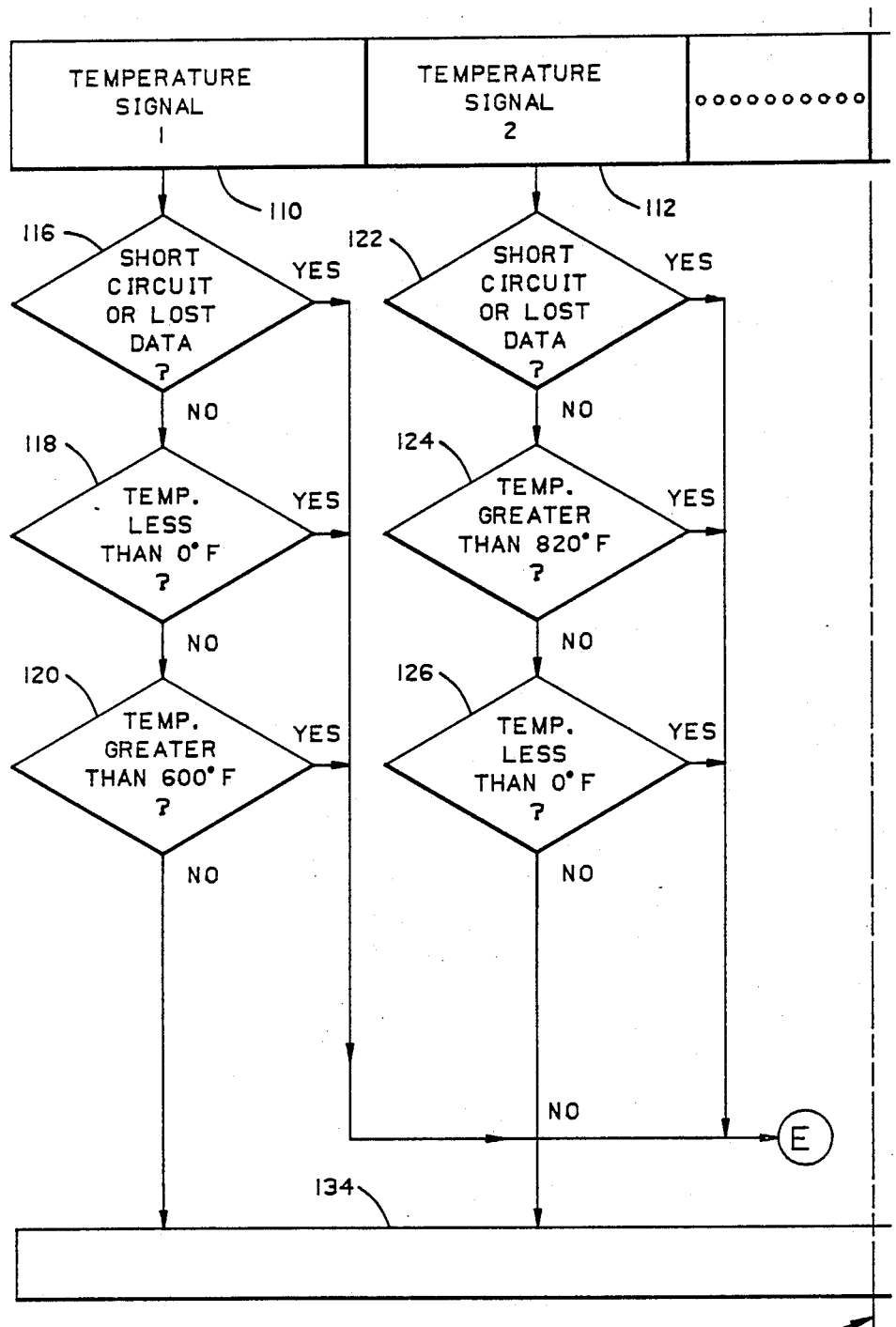
FIGS. 4A–4C, is a flowchart for the data integrity check 86.
Figure 4B:
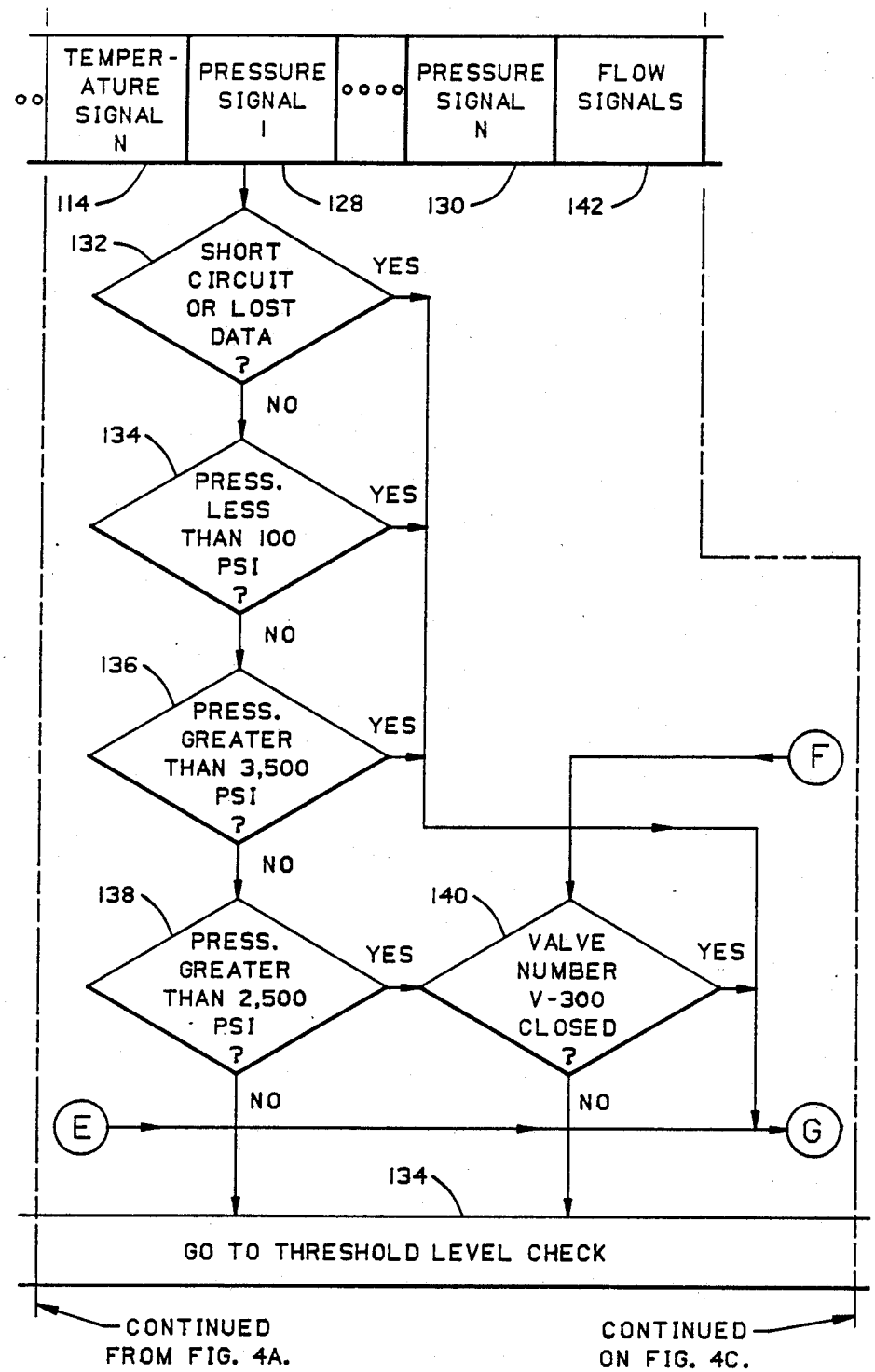
Figure 4C:
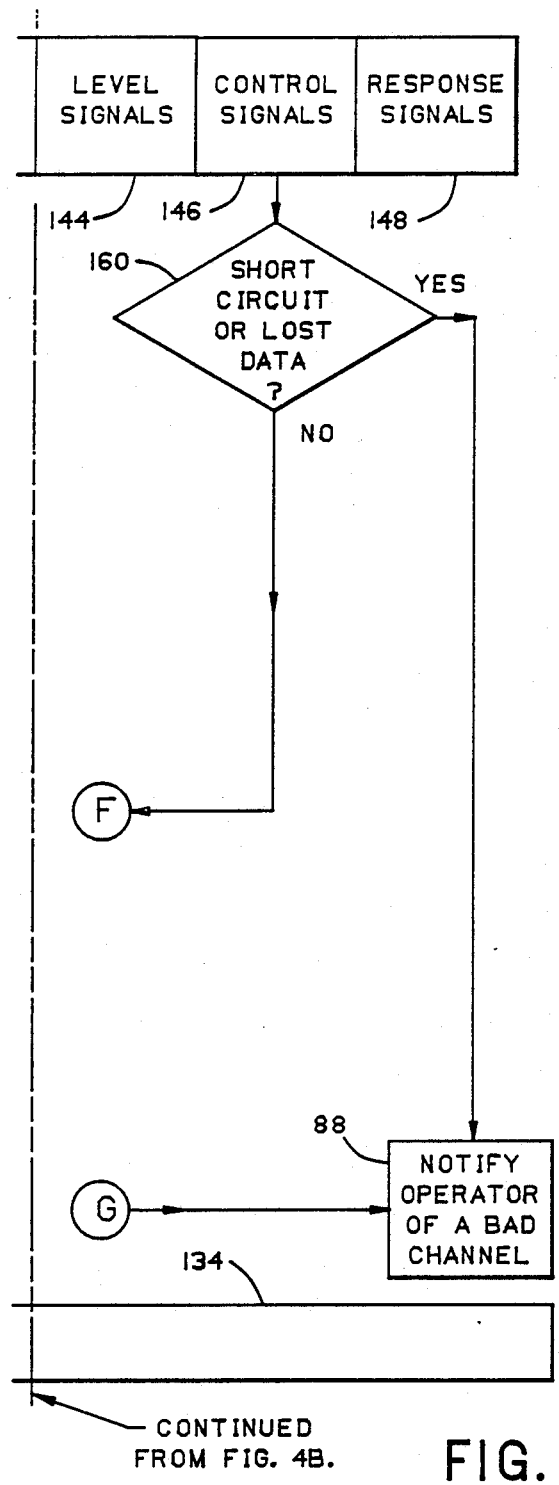

The details of operation of the sampling software module 30 will be explained with respect to FIGS. 3, 4 and 5. Referring to FIG. 3, the input database 60 contains an array indicating sensor type. This array associates the many input signals channels with particular sensors in the plant. Sensor signals for pressure, temperature, flowrate and level are recorded along with control signals such as valve position and pump status (on or off) and response signals such as strain or displacement. The recording operation is preferably performed one sensor at a time, however, it is possible to sample all sensors 16 and 18 and then perform integrity checks on the samples. First, if the signal sampled is an analog sensor, a sensor channel is selected 82 by incrementing the input selected by the multiplexer in the signal conditioning unit 20. This is performed by incrementing a channel pointer and outputting the pointer to the multiplexer. The appropriate digitizer is then activated 84 to sample the signal and the computer 12 stores the sample in temporary memory. If the sensor signal is a digital signal, the computer merely reads the digital value from the appropriate location. In the data integrity check 86, temperature, pressure, flowrate, and level are compared with the engineering units and allowable sensor ranges of the input database 60 to assure the sensors are working correctly. The allowable ranges are determined by the laws of nature and the capacities of the plant. For example, referring to FIG. 4 which provides the details for representative integrity checks, using the established system of units, temperatures in a power plant would never be expected to be below 0° F. If a sensor indicated a measured temperature 110 below 0° F. (118), the data integrity check would cause the operator to be advised 88 of the anomaly. Similarly, if a sensor produced a temperature signal 112, indicating 120 a temperature above a certain value which would be specific to a certain plant, the data integrity check 86 would again cause the operator to be advised 88 of the anomaly. The same procedure is applicable to pressure 128 and 130, flowrate 142 and level 144 sensor signals. Each sensor of each type can, of course, have its own allowable range. Data integrity checks can also be designed for control 146 and response 148 signals. These are not as widely used and are based on binary decisions rather than ranges. As an example, if a signal 128 for a pressure indicates a value within 134 an allowable range, but a control signal indicates 140 that the valve providing that pressure is closed, an inconsistency exists and the data integrity check 86 would alert 88 the operator to the problem. The data integrity check would alert 88 the operator to the problem including any short circuits or if data is lost 160.

After the integrity check is performed, a determination is made 89 whether data from the sensor for a predetermined time window for example, 4 or 5 samples has been collected. If so, the samples are compared 90 (FIG. 3B). to a threshold level that determines whether a transient has occurred. If the sensor values are within the threshold range, rotating storage 92 is updated 94, from which steady state statistics are computed 96. If the sensor values are outside the transient threshold range, the duration of the recording period for the transient is determined and the transient is recorded 98. Both the steady state statistics and transients are stored in the transient and steady state time history database as, for example, a list of temperatures and the times at which the temperatures were recorded.

To discuss the steps 90-96 in greater detail, a typical piping section 160 and a typical transient 162 are shown in FIGS. 5 and 6. The pipe 160 has two critical locations 164 and 166 about which fatigue information is desired. One of these 164 is monitored for temperature, pressure, flowrate, level and control and response signals, as previously described. The other location 166 is not monitored, or is insufficiently monitored, that is, only pressure and level are available at location 166. The typical transient 162, shown in FIG. 6, represents the change in temperature over time for a transient detected at a monitored critical location 164. Signals for pressure, level and flowrate also vary at the monitored critical location 164, but use of the temperature signal is used as an illustration, while substantially identical operations are performed for the other types of signals. Assuming that the input signal at the monitored location pass the data integrity check 86 (FIG. 3), the next step is to check 90 for threshold level violations. Data is sampled and collected for a time window of preferably 20 seconds for each sensor. As long as the values for pressure, temperature, flowrate and level for all monitored locations stay within threshold levels indicated in the input database 60 during that time period, all that is done is to update 94 the rotating storage 90 and compute steady state statistics 96. The rotating storage 90 is preferably a data log of the most recent ½ hour of steady state data.

Steady state statistics can consist of means, maximum, minimum, and other statistical data for the signals for the duration of the time window. This steady state statistical data becomes part of the transient and steady state time history database 62. This database can be kept for the life of the plant, if desired on magnetic tape.

If any monitored temperature, pressure, flowrate, or level signal in the entire plant exceeds the threshold values stored in the input database 60, transient recording starts for all monitored locations in the plant and continues until a steady state is reestablished for a predetermined period. The threshold values of the input database 60 are determined by engineering calculation and judgments made by the plant designers and would be values at which fluctuations will cause more than negligible fatigue. For example, in a typical plant, temperatures may fluctuate by plus or minus "T" degrees Fahrenheit and cause negligible fatigue while temperature fluctuations larger than that range could induce stresses of magnitudes that could begin to cause fatigue.

Figure 7A:
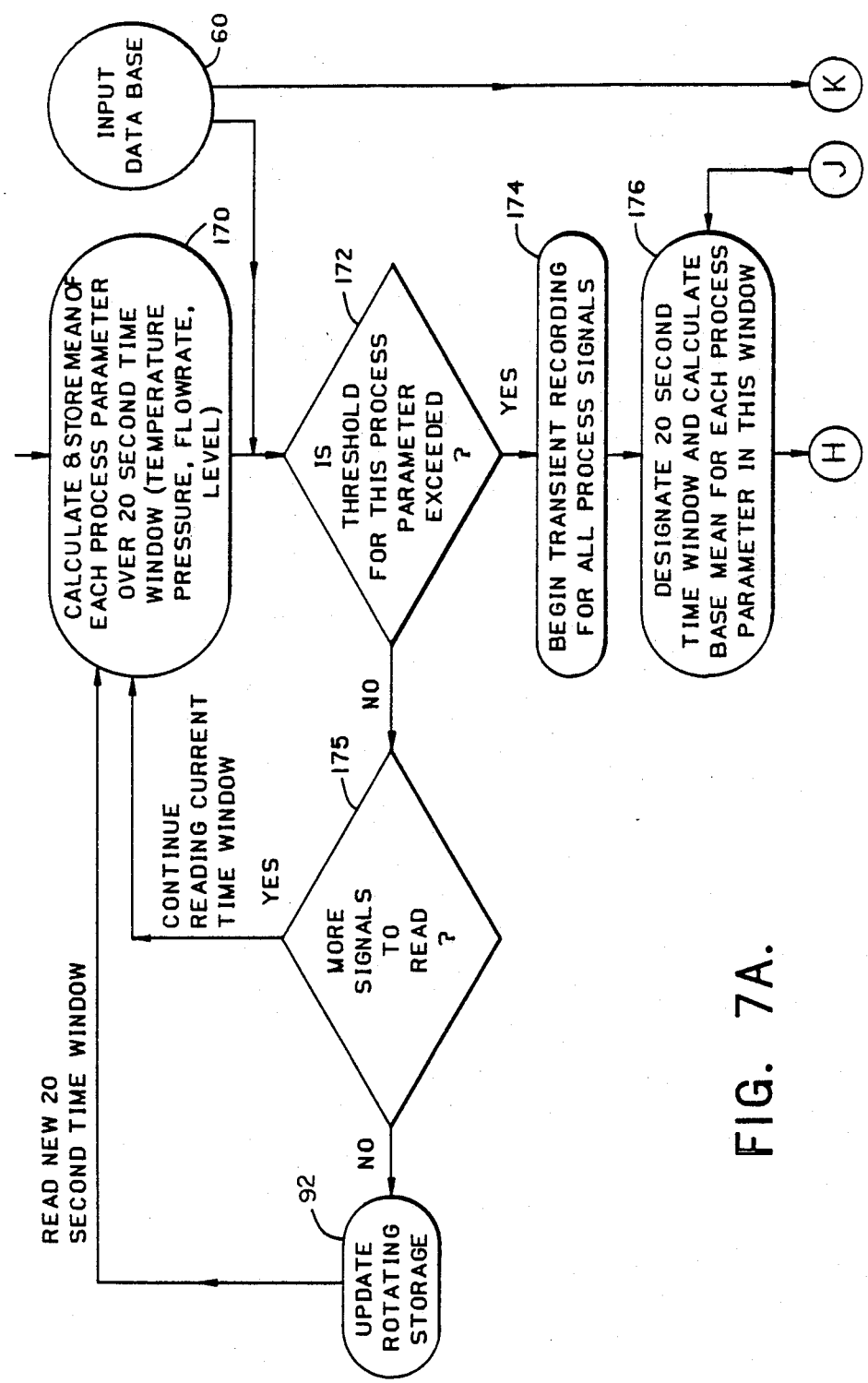
FIGS. 7A–7C, is a flowchart of the process for determination of transient recording duration.
Figure 7B:
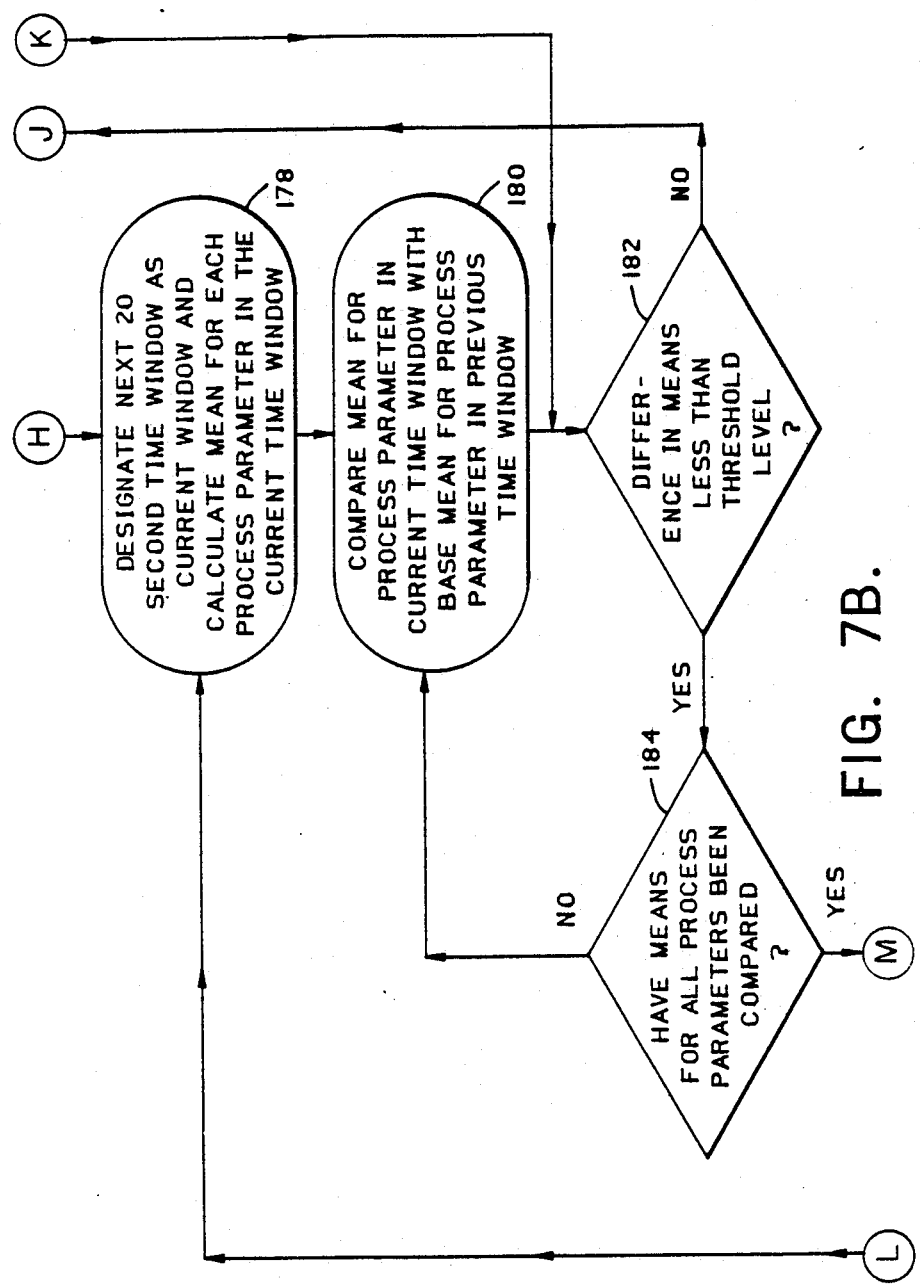
Figure 7C:
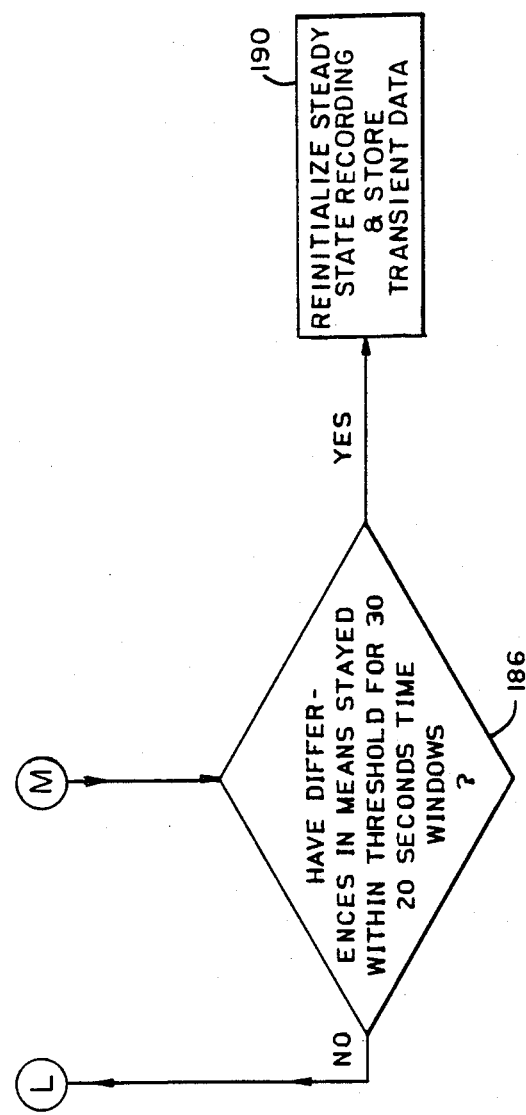

FIG. 7 illustrates the steps 89-98 in greater detail when a particular channel or channels are designated as trigger channels for triggering recording due to transient detection. Not all channels are designated as triggering channels and the designations would be made by the plant designer based on failure likelihoods or regulatory requirements. First, the mean value for a process parameter (for example, temperature) is calculated 170 over a given time window, typically 20 seconds. If the difference between this calculated mean and the mean established for this signal after the end of the previous transient exceeds the threshold level 172, transient recording begins 174 for all channels. If the threshold is not exceeded for the process parameter (temperature) being checked, additional signals are read 175 (for example, pressure) until all process parameter signals have been read for that time window. If none of the parameters (temperature, pressure, etc.) exceeds the threshold, rotating storage is updated 91, as described earlier, and a new time window is read 170.

Once a temperature transient 162, or any other temperature, pressure, flowrate or level signal has exceeded 172 its threshold, the reading operation switches from the steady state recording already described to transient recording. Transient recording retains a great deal more data than steady state recording. In transient recording, all sampled data is retained during each 20 second time window until compressed in the transient analysis module 32 which will be explained later. Thus, rather than 4 or 5 datapoints being kept as in steady state recording, hundreds of data points are kept for each sensor signal. If a sensor signal is sampled at 10 samples per second, 200 samples will be kept for that parameter in a 20 second time window. Transient recording continues until the algorithm to determine recording duration indicates that steady state recording can begin again.

After transient recording begins for all channels 174, the base mean is calculated 176 from the first 20 seconds of data designated as the first window. The mean of the signal for current time window for pressure, temperature, flowrate and level signals is calculated 178 and compared 180 to the value for the corresponding signal during the previous time window. When the mean for the current time window is different from the mean for the previous time window by less than the threshold for a given channel, the mean for the previous time window becomes the base mean for comparison for that channel. That is, the base mean for the previous time window is not changed. Comparisons for future time windows of that channel are compared 180 to the base mean for that channel.

If the difference between a current time window mean and the base mean equals or exceeds 182 the threshold the previous base mean is invalid and a new one must be established 176 After a threshold check has occurred, a determination 184 is made concerning whether all parameters for this window have been compared. When base mean values can be established and held 186 for all pressure, temperature, flowrate and level signals simultaneously for a given period, 10 minutes, for example, transient data collection stops and the system is returned to the steady state mode 190.

An example transient signal will clarify the operations described above. In FIG. 6, the transient signal 162 stays within the threshold until it violates the threshold at point 192. At point 192 high speed recording begins. That is rotating storage is not updated as in the steady state case and all samples get stored. Between point 192 and period 194, the signal is continually violating the threshold around each new base mean value. During period 194, the signal stays within the threshold for approximately 2¼ minutes until point 196. Since this is less than the 10 minute threshold re-establishment period, high speed recording continues. Between point 196 and the beginning of period 198 once again, the threshold is continually violated. During period 198 the signal stays within a newly computed threshold range for the 10 minute period and high speed recording would stop at time 27 minutes and resumption of the updating of rotating storage would occur. After steady state recording is again initialized, if the threshold around the base mean value for one channel is violated, the system again switches to transient mode high speed recording for all channels. While in the transient mode, data is stored in the steady state and time history database 62 at the higher speed sampling rate established for the system.

The operation transient parameter analysis module 32 will now be explained with reference to FIG. 8. Using data from the input database 60, and the real time data being provided in the transient and steady state time history database 62, each channel is examined to determine 200 the signal type. The signal type is indicated in an array associated with the sensor identified. The signal types are pressure (P), temperature (T), flowrate (Q), level (L), control (CS) and response (RS). Examples of control signals (CS) are valve position (percent open), or pump status (percent of full load) while examples of response signals (RS) are strain or displacement. The values for the control signal and response signals simply pass 202 and 204 to the transient parameter database 64 for future use by the plant operators or engineers, or are used in other component tracker modules. If the signal is pressure, temperature, flow, or level, a data compression process takes place 206.

During data acquisition by the sampling software module 36 (FIG. 2) data is sampled at rates high enough to assure gathering of all relevant data. This process results in accumulation of more data than is needed at some times, but these time periods cannot be determined until after the data is collected. The compression module 206 keeps relevant data and eliminates excessive data. For each type of signal (pressure, temperature, flowrate, level) this is done in a different way. For temperature signals in nuclear power plants, a datapoint (including temperature and time) is typically kept for every 5° F. change in temperature. For pressure, a datapoint is typically kept for every 100 PSI change in pressure. Similarly, based on plant requirements for flowrate signals, a datapoint can be kept for each change in flowrate of some specified magnitude, and for level signals a datapoint can be kept for a certain specified change in level. Other types of processes would require different compression values. Since pressure and temperature changes are often the most important for fatigue determination, it is also possible to associate each flowrate or level signal with a certain pressure or temperature signal. In this case, each time a datapoint is saved for a given temperature or pressure signal, the corresponding datapoints for any associated flowrate or level signal, are also saved. In addition, during the compression process, statistical data for the recorded transient are calculated.

The reduced set of pressure, temperature, flowrate and level signal data points and control and response signal data points and statistical data, form the transient parameter database 64 where the compression method is disclosed below.

Figure 8:
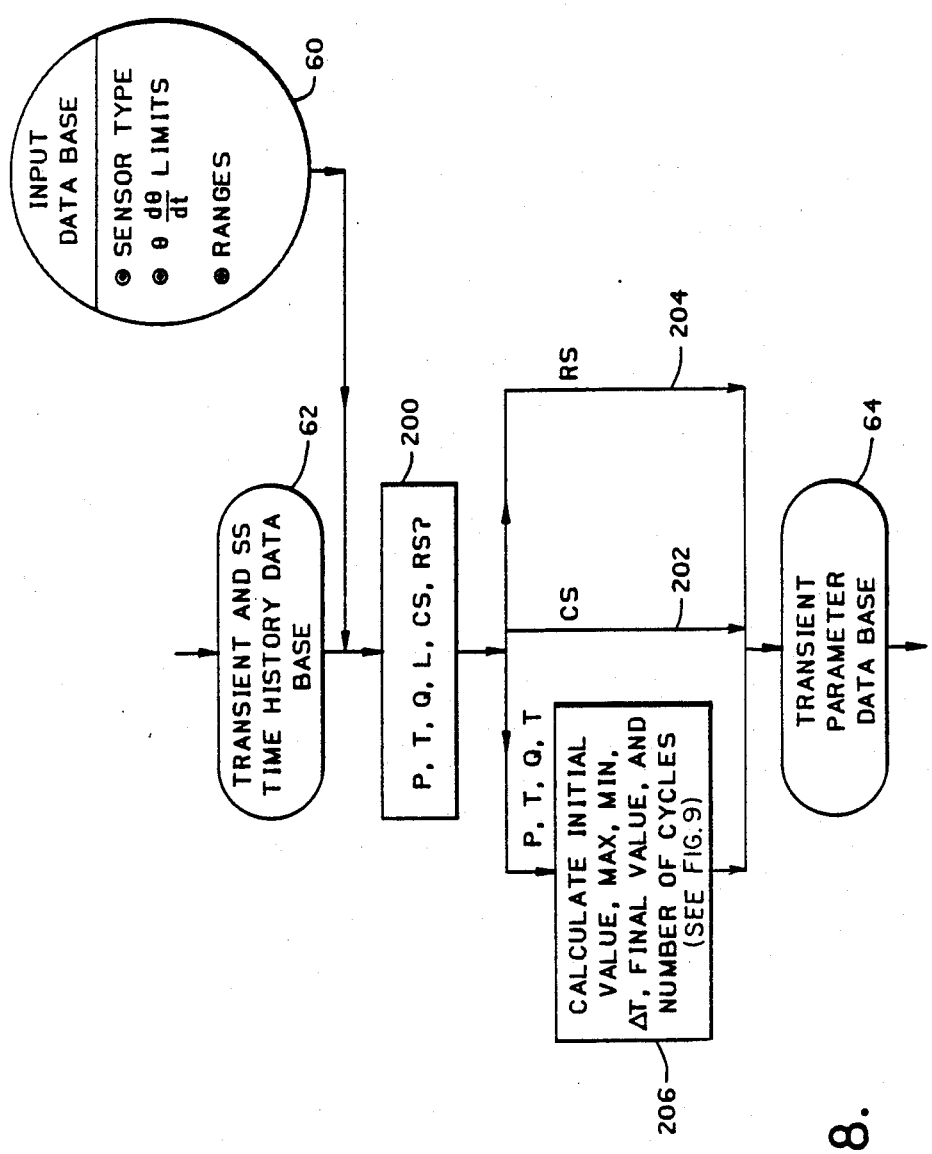
FIG. 8 is a flowchart of the transient parameter generation module.
Figure 9A:
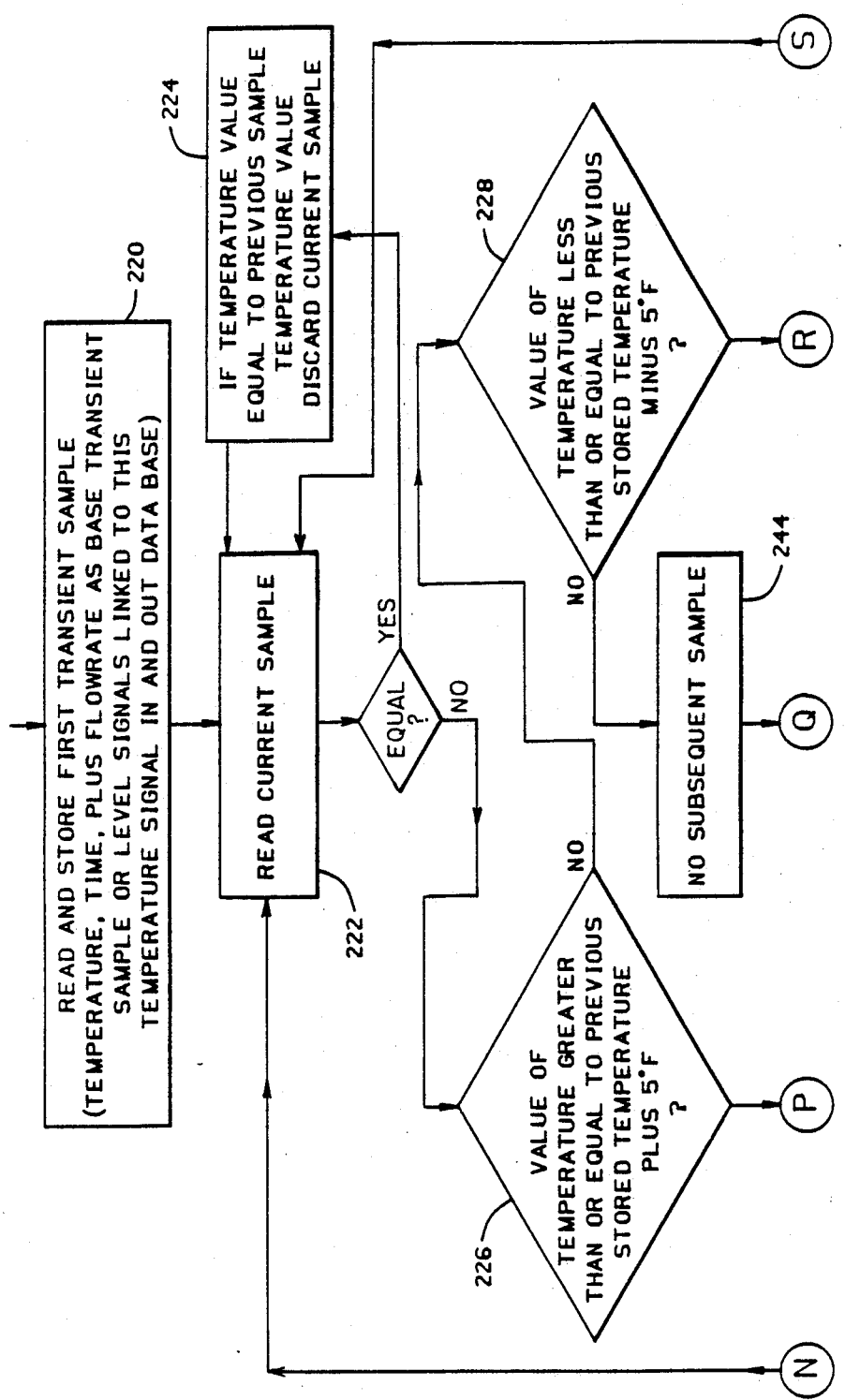
FIGS. 9A–9C, is a flowchart of a typical analysis module.
Figure 9B:
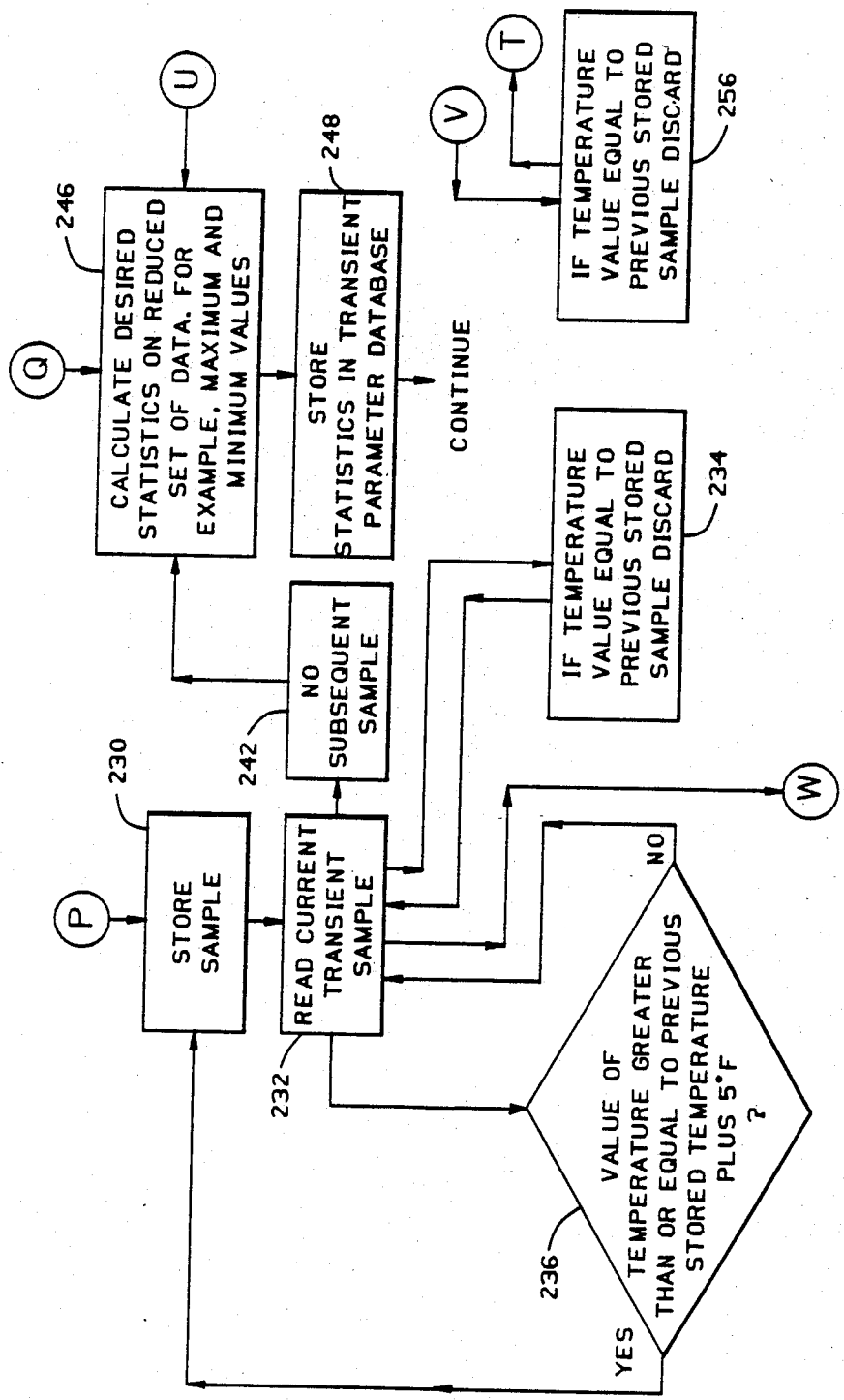
Figure 9C:
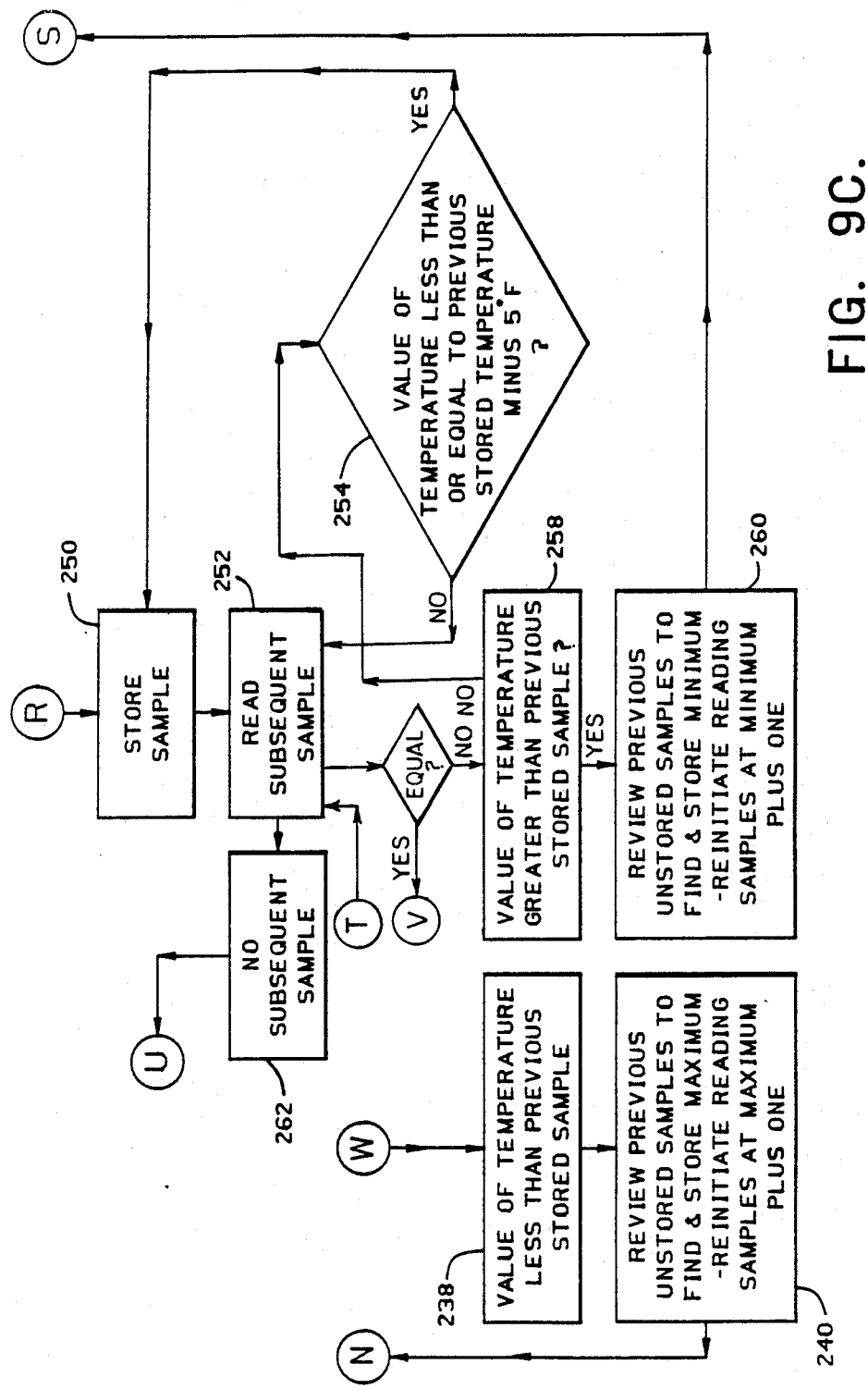

FIG. 9 illustrates how a temperature signal from one channel is processed through the transient parameter generation module 32 which performs the data compression of block 206 in FIG. 8. Other channel temperature signals and other process signals (pressure, level, etc.), are handled similarly. While the sampling module 30 is a real time program, the transient analysis module 32 is an on-line module. It runs automatically when the transient and steady state time history database 62 contains a predetermined number of samples that is, when it is full. The first transient sample of temperature data is first read and stored 220 as the base transient sample.

A transient sample with respect to FIG. 9 will now be defined which is different from the standard definition well known to those skilled in the art. If data is sampled (using the traditional definition of a sample which is a single digitization of an analog value at a time instant) at 10 samples per second, a transient sample in FIG. 9 could be of only one of the 10 points of temperature data in the one second time window. That is, a transient sample would be one of the samples in a ten sample time window. A transient sample also contains the associated time at which the temperature was read, along with the value of any flowrate or level data which has been linked to the temperature data through the input database 60 sampled at the same time as the temperature data point. The one out of ten samples that becomes the transient sample is chosen by the process of FIG. 9. This definition of a transient sample will be used throughout only FIG. 9.

After the first sample is read and stored 220 as the base transient sample, a next or current sample is read and three things can happen. First, the temperature in, the current transient sample can equal 223 the temperature of the base transient sample. If this happens, the data of the current sample is discarded 224 and the next or a new current sample 138 is read. Second, the temperature of the current sample can be greater 226 than the value of the temperature for the base transient sample. Third, the temperature of the current sample can be lower 228 than the temperature of the base sample. The process occurring after the second and third possibilities are very similar and the process occurring after the second possibility will now be explained in detail while the process occurring after the third possibility will not be explained in detail, for simplicity purposes.

When the value of temperature for the current transient sample is greater than the base transient sample 226, two possibilities exist. First, the current sample can be larger by less than some value "T", for example, 5° F. If this is the case, the data for the subsequent sample is discarded and the next or a new sample is read 222. The second possibility is that the temperature for the current transient sample is greater than the value for the first transient sample by greater than or equal to 5° F. If this is the case, the sample is stored in the transient parameter database as a transient sample and becomes the new base transient sample. Then, the next or a new current sample is read 232. If the temperature of this latest current sample is equal to the value of the sample just stored, the current sample is discarded 234 and a new current sample is read 232. If the value of the subsequent sample 146 is less than 5° F. greater 236 than the stored sample, the data for this sample is discarded and a new current sample is read 232. If the value of the subsequent sample is greater than or equal to the value of the stored sample plus 5° F., the subsequent sample is stored 232 as a transient sample and becomes the base transient sample for comparison with future samples. If the value for the current sample is less than 238 the value for the previous stored transient sample or the newest base transient sample, samples after the previous stored sample and before the current sample 146 in question are reviewed 240, by using the transient and steady state time history database 62 and reading starts again at one point past the maximum. That is, the time associated with the previous base transient sample is used as a start point and the time of the current transient sample is used as the end point of a time period used for scanning the data in the transient and time history database 62. The maximum temperature in this time period is found 240 and this sample is stored in the transient parameter database 64 as a transient sample.

If any attempt to read a subsequent sample anywhere in the above-described process fails 242 or 244 it indicates that the data in the transient and steady state time history database 62 has all been read. At this point, the desired statistics 246 are calculated on the transient parameter database 64 which now contains all data stored from the processes. The statistical data is then added 248 to the transient parameter database 64.

Figure 10:
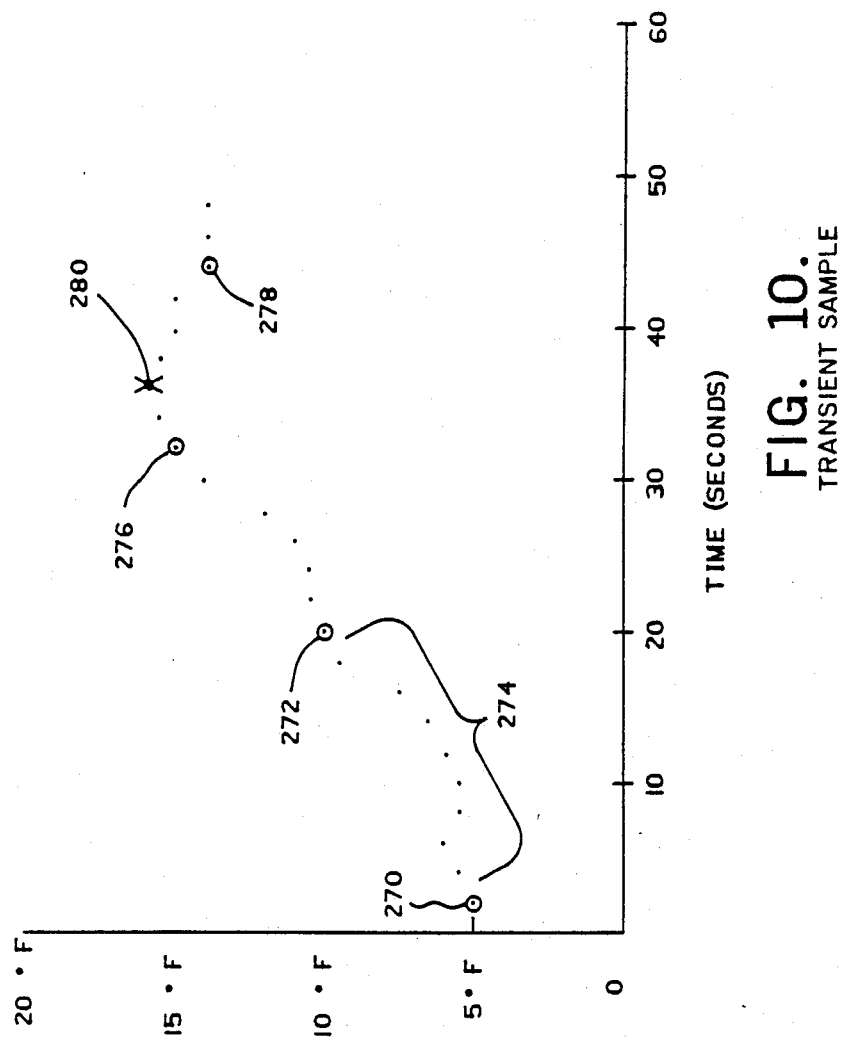
FIG. 10 is another sample transient.

For example, assume that the transient and steady state time history database 62 includes temperature points (transient samples), illustrated in FIG. 10 for a positive going transient. The first transient sample 270 is the base transient sample and is stored (5° F.) in the transient parameter database 64 along with its time of occurrence (2 seconds). The subsequent transient samples are then compared with the base transient sample until the 5° F. threshold is attained at point 272 with the intervening transient samples 274 being discarded. The temperature (10° F.) and the time (20 seconds) are stored in the database 64 and point 272 becomes the new base transient sample. The process continues with point 272 as the base transient sample. As can be seen from FIG. 10, point 276 will be the next base transient sample. When the point 278 is reached where the temperature is less than that at point 276, the point 278 is stored and the scanning of the transient and steady state time history database 62 begins at time equal to 32 seconds (point 276) and ends at time 44 seconds (point 278). The scan looks for the maximum transient sample (point 280) by comparing the temperature values and stores the temperature (17° F.) and time (36 seconds) in the transient parameter data base 64. When all data is exhausted, the statistics for the transient are determined. That is, the minimum is indicated as point 270 (temperature equal 5° F. at 2 seconds), the maximum is indicated as point 80, the initial value as point 270, the final value as point 278, the time t as 42 seconds and the number of cycles as one. Similar storage and analysis occurs if the transient is a negative going transient.

Figure 11:
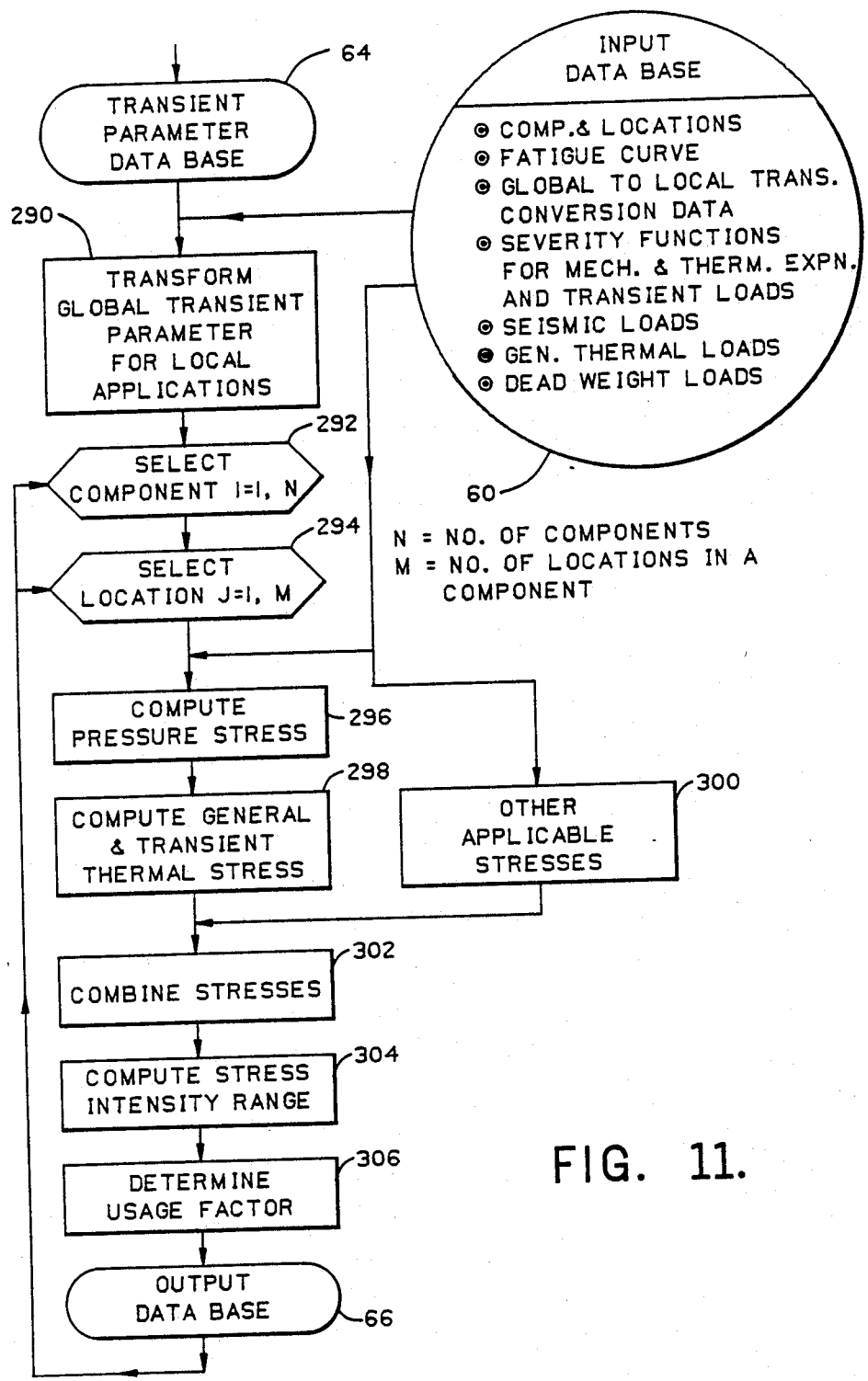
FIG. 11 is a flowchart of the method for determining stress age or remaining life.

Operation of the fatigue calculation software module 34 will be explained with respect to FIG. 11. The input database 60 contains information on each channel of pressure data, each channel of temperature data, each channel of flowrate data, each channel of level data and each control and response signal contained in the transient parameter database 60, pertaining to global to local transformations. First, a global to local transformation is performed 290 between monitored and unmonitored points (See FIG. 5). In this example, there are two critical location possibilities, monitored 164 and unmonitored 166. A monitored critical location has monitoring equipment attached which monitors all relevant process, control, and response parameters. At any monitored critical location 164, any of pressure, temperature, flowrate, level, control signals and response signals may be monitored as necessary. Not all monitored critical locations 164 require that all parameters be monitored. A monitored critical location 164 is considered so if all parameters relevant to fatigue calculations at that location are monitored. At the unmonitored locations 166, either not enough parameters are monitored to fully characterize the fatigue response of the system, or no monitoring is done at all. The input database 60 physically correlates (distance, etc.) the critical locations 164 with the process and response channels of the transient parameter database 64. For each critical location 164 and 166 (FIG. 5), the input database 60 contains the following information: (1) the parameters monitored at that location, and (2) whether the location is monitored or unmonitored as defined earlier. For unmonitored critical locations 166, a transformation of global transient parameters from a nearby monitored location 164 must be applied to obtain the information necessary to perform fatigue calculations at the unmonitored location 166. In the example, pressure and level are monitored at the unmonitored location 166, but temperature and flowrate are also needed. The transformation 290 of FIG. 11 uses the well known laws of fluid mechanics and heat transfer to extrapolate the values of temperature and flowrate at the unmonitored location 166 in FIG. 5 using the known values of these parameters at the monitored location 164.

For example, assume the distance between location 164 and 166 in FIG. 5 is 10 meters, and the pipe diameter is 10 millimeters (values stored in input database 60). These dimensions are smaller than might actually be the case in a plant situation, but are chosen for illustration. We assume that the pressure is monitored at location 164 but not monitored at location 166 and that the flow is directed from 164 to 166. Because of friction losses, the pressure at 166 is less than at 164, and the equation governing the pressure drop is:

$$(P164/\rho + \alpha 164 \, V164^2/2 + gz164) - (P166/\rho + \alpha 166 \, V166/2 + gz164) = h_1 + h_{1m} \quad (1)$$

where: $h_1 = \frac{fLV^2}{2D}$ and $h_{1m} = \frac{KV^2}{2}$

For incompressible flow, fluid density ($\rho$) is constant, and since the pipe area is constant, the flow velocity (V) is constant. The pipe horizontal so the vertical height (z) is constant. Assuming fully developed flow in a straight section of pipe, $h1_m = 0$. The above equation thus reduces to:

$$\frac{P_{164}}{\rho} - \frac{P_{166}}{\rho} = \frac{fLV^2}{2D} \quad (2)$$

where:
P164=Pressure at Location 164
P166=Pressure at Location 166
f=Friction Factor (from Moody chart)
L=Pipe Length
D=Pipe Diameter
V=Fluid Velocity $$\text{also: } f = f\left(Re, \frac{e}{D}\right) \text{ and } Re = \frac{\rho VD}{\mu}$$

where e/D is a measure of pipe surface roughness and is taken as 0.0002 in this example. For water at 20° C., $\rho = 999$ Kg m$^3$ and $\mu = 1.0 \times 10^{-3}$ Kg/m(sec).

Assume flow rate Q=0.1 m$^3$/sec, so:

$$V = \frac{Q}{A} = \frac{Q}{\frac{\pi D^2}{4}} = \frac{4Q}{\pi D^2} = \quad (3)$$

$$\frac{4}{\pi} \frac{(0.1 m^3)}{\text{sec}} \frac{(1)}{(0.15)^2 m^2} = 5.66 \text{ m/sec}$$

$$Re = \frac{4\rho Q}{\pi \mu D} = \frac{4}{\pi} \times 999 \frac{\text{Kg}}{m^3} \times \frac{0.1 m^3}{\text{sec}} \times \quad (4)$$

$$\frac{m(\text{sec})}{1.0 \times 10^{-3} \text{ kg}} \times \frac{1}{0.15 \text{ m}}$$

$$= 8.48 \times 10^5$$

For Re=$8.48 \times 10^5$ and e/D=0.0002, the Moody chart, which indicates a pipe friction factor for a surface roughness (e/D) and Reynolds number (Re), a dimensionless constant that is a measure of flow turbulence, gives f=0.0149, then, $$P_{164} - P_{166} = \frac{fL\rho V^2}{D2} = \quad (5)$$

$$0.0149 \times \frac{10 \text{ m}}{0.15 \text{ m}} \times 999 \frac{\text{Kg}}{m^3} \times$$

$$\frac{1}{2} \times (5.66)^2 \frac{m^2}{\text{sec}^2} \times \frac{N(\text{sec})^2}{\text{kgm}}$$

Since $P_{164}$ would be monitored, the value of $P_{166}$ could be calculated using the above equation. Similar relations exist for heat and fluid flow transfer. References for fluid mechanics and heat transfer local to global transformations that can be used to produce transformations for more complex structures and that are incorporated by reference herein include: Fox and McDonald, *Introduction to Fluid Mechanics*, Second Edition, John Wiley and Sons, New York, 1978.; and Ozisik, M. Necati, *Basic Heat Transfer*, McGraw Hill, New York, 1977. One of ordinary skill in the art could provide suitable transformation equations from the teachings of these references.

After the completion of the transformation 290 (FIG. 11), all critical locations have all the process, control, and response parameters required for fatigue calculation either from direct monitoring or extrapolation. At this point, stresses and fatigue are calculated for each component desired (by selecting a component 292), each of which may have multiple critical locations (and by selecting a location 294) where stress and fatigue information is desired. The process now described takes place for each critical location and each component.

First, stresses due to pressure loads are calculated 296. This is done as follows. Pressure stresses are essentially linear with increasing pressure. Stresses for conservative pressure loads at critical locations are calculated in the design stress report prepared at plant design time by the plant design engineers. The value of this stress, and its associated pressure are scaled to a unit value and stored in the input database 60. Then, given the actual monitored pressure recorded and stored in the transient parameter database, the value of unit stress in the input database 60 is scaled accordingly. For example, suppose the pressure used in the design basis stress report is 3,000 psi. The stress at a critical location consists of 6 components, 3 normal stresses ($\sigma_x$ $\sigma_y$ $\sigma_z$) and 3 shear stresses ($\sigma_{xy}$ $\sigma_{yz}$ $\sigma_{zx}$). For simplicity, only one component is discussed since the methodology is identical for the others. Suppose the stress from the design basis stress report is 12,000 psi for the 3,000 psi pressure at the location in question. That is, at a fluid pressure of 3,000 psi 12,000 psi of stress is developed (i.e. a 1:4 linear relationship exists). The stress and associated pressure that would be stored permanently in the input database 60 would be 4,000 psi for a 1,000 psi load. Suppose now the cycle monitoring system records a pressure of 2,000 psi at the location in question at a given time. The pressure stress computed 296 for that time would be 8,000 psi. Additional information on computing pressure stresses can be obtained from Shigley, *Mechanical Engineering Design*, Third Edition, McGraw-Hill, New York, 1977, incorporated by reference herein.

Next, stresses due to general and thermal transient stress are calculated 298. The method of calculation of transient thermal stresses will be discussed later with respect to FIGS. 13–16. Stresses due general thermal loads also exist. General thermal loads, to distinguish from the thermal transient loads, are loads due to expansion or compression of materials due to, for example, global temperature changes in the temperature of fluid flowing through a pipe. General thermal loads are calculated at the time of plant design. The methodology to calculate stresses for the general thermal loads is identical to that just described for pressure loads, except temperature is the monitored parameter. Additional information on general thermal stress calculations can be obtained from Roark and Young, *Formulas for Stress and Strain*, Fifth Edition, McGraw-Hill, New York, 1975, incorporated by reference herein. Seismic loads and dead weight stress loads are fixed at the design time of the plant and stresses (general stresses) due to these loads are also calculated at plant design time and stored in the input database 60. Stresses due to these loads are read 300 from the input database 60. No scaling is necessary for these stress loads as is done for pressure and general thermal loads and the conservative design stresses are used. The stresses are combined 302 by simple addition of each stress component from each load condition.

The next step is to determine 304 the stress intensity ranges. This is done as follows. Each transient experienced by the plant and monitored by the system has one or more times where high or low peaks in the process parameters (temperature, pressure, etc.) appear in the transients. The stress peaks for pressure are coincident with the pressure peaks; however, temperature stress peaks lag behind the temperature transient peak. The procedure discussed hereinafter concerning a Duhamel integration produces the stress peaks. These are stored in the transient parameter database 64. Once the stress peak(s) for the new transient are determined, the stress ranges are updated. For example, assume the present transient being considered has one peak stress set at the location in question (a spot on a pipe wall). Let the stresses for this transient be denoted by:

$$\sigma x_1, \sigma y_1, \sigma z_1, \sigma xy_1, \sigma yz_1, \sigma zx_1 \quad (7)$$

Assume also that two transients have occurred previously, each with one stress peak at the location desired. The stresses here are $$\sigma x_2, \sigma y_2, \sigma z_2, \sigma xy_2, \sigma yz_2, \sigma zx_2 \quad (8)$$

$$\sigma x_3, \sigma y_3, \sigma z_3, \sigma xy_3, \sigma yz_3, \sigma zx_3 \quad (9)$$

Note that all of these are peak stresses at a single point, the point of maximum stress through the wall. This point will not usually change with different transients experienced by nuclear power plants, and is usually the inside surface of the pipe, nozzle or component in question. We now make the notation more compact and denote the stresses from the three transients by:

$$(\sigma_{ij})_1 \ (\sigma_{ij})_2 \text{ and } (\sigma_{ij})_3 \quad (10)$$

and create three stress ranges:

$$(\sigma_{ij})_A = (\sigma_{ij})_1 - (\sigma_{ij})_2 \quad (11)$$

$$(\sigma_{ij})_B = (\sigma_{ij})_2 - (\sigma_{ij})_3 \quad (12)$$

$$(\sigma_{ij})_C = (\sigma_{ij})_3 - (\sigma_{ij})_1 \quad (13)$$

Then, each of the above three sets of normal and shear stress ranges can be turned into principal stress ranges ($\sigma_1, \sigma_2, \sigma_3$) consisting only of normal stresses by solving the following cubic equation for each stress range above:

$$\sigma^3 - D\sigma_2 + E\sigma - F = 0 \quad (14)$$

where $$D = \sigma_x + \sigma_y + \sigma_z \quad (15)$$

$$E = \sigma_x\sigma_y + \sigma_y\sigma_z + \sigma_z\sigma_x - \sigma_{xy}^2 - \sigma_{yz}^2 - \sigma_{zx}^2 \quad (16)$$

$$F = \sigma_x \sigma_y \sigma_z + 2\sigma_{xy} \sigma_{yz} \sigma_{zx} - \sigma_{xy}^2\sigma_z - \sigma_{yz}^2\sigma_x - \sigma_{zx}^2\sigma_y \quad (17)$$

Solving the equation for each of the three stress ranges above results in the following principal stress ranges:

$$(\sigma_1 \ \sigma_2 \ \sigma_3)_A \quad (18)$$

$$(\sigma_1 \ \sigma_2 \ \sigma_3)_B \quad (19)$$

$$(\sigma_1 \ \sigma_2 \ \sigma_3)_C \quad (20)$$

And the following stress intensity ranges $$(\sigma_{12} \ \sigma_{23} \ \sigma_{31})_A \quad (21)$$

$$(\sigma_{12} \ \sigma_{23} \ \sigma_{31})_B \quad (22)$$

$$(\sigma_{12} \ \sigma_{23} \ \sigma_{31})_C \quad (23)$$

where, for each of A, B, and C:

$$\sigma_{12} = |\sigma_1 - \sigma_2| \quad (24)$$

$$\sigma_{23} = |\sigma_2 - \sigma^3| \quad (25)$$

$$\sigma_{31} = |\sigma_3 - \sigma_1| \quad (26)$$

These are the stress intensity ranges 304 calculated for each transient. Additional information on stress peak determination, stress range and stress intensity range updating can be found in Shames, I. H., *Introduction to Solid Mechanics*, Prentice Hall, Englewood Cliffs, N.J., 1975, incorporated by reference herein.

Figure 12:
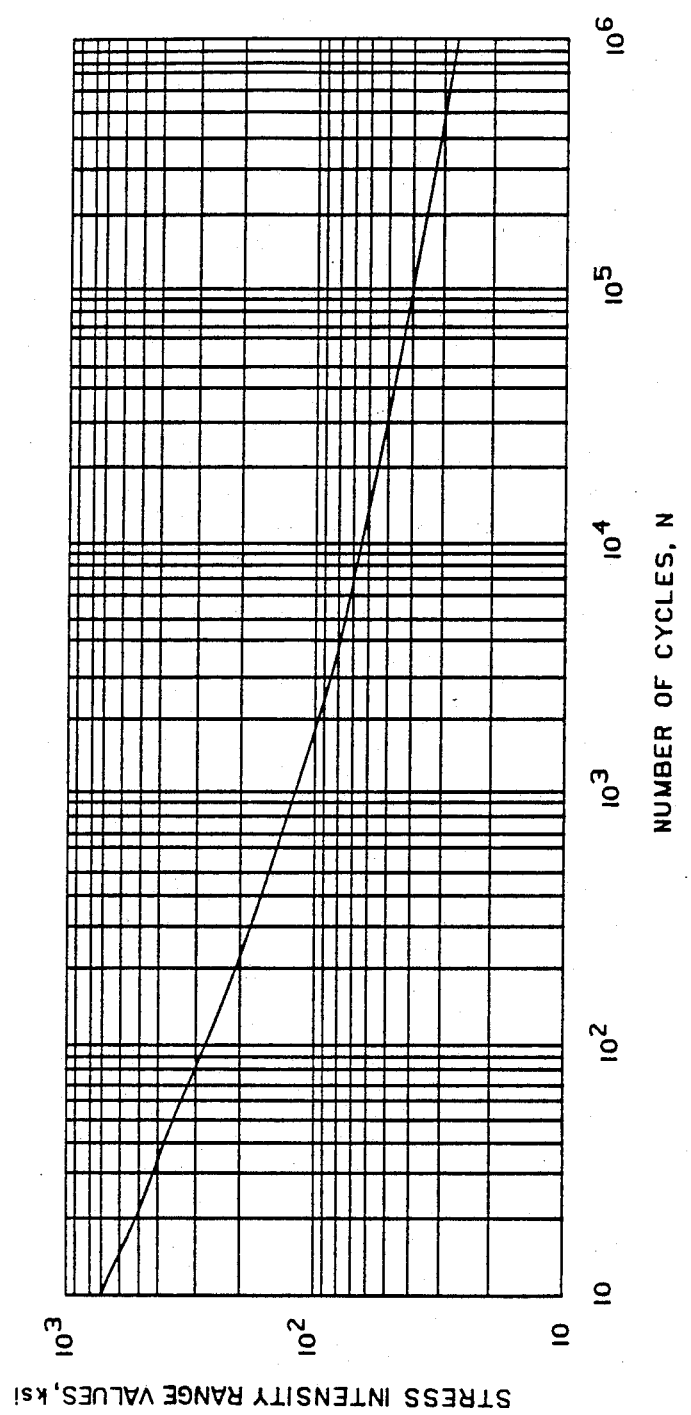
FIG. 12 is a sample fatigue curve.

Next, the usage factor is determined 306 using the following procedure. The stress intensity ranges have been calculated for each transient peak as just described. For each transient peak, one stress intensity range is a maximum. Let us assume $\sigma_{12}$ is maximum for each transient. Each value of $\sigma_{12}$, that is $(\sigma_{12})_A \ (\sigma_{12})_B, (\sigma_{12})_C$ is compared to the fatigue curve for that location contained in the input database 60. The fatigue curve is determined at component design time and an example is illustrated in FIG. 12. The Y-axis of the fatigue curve is stress intensity range and the X-axis is the allowable number of cycles on a logarithmic scale. Let us say that 100 cycles of $(\sigma_{12})_A$ are allowed, 50 cycles of $(\sigma_{12})_B$ are allowed, and 200 cycles of $(\sigma_{12})_C$ are allowed. Then, assume that one cycle of each stress intensity range occurs, the total fatigue usage at the point is:

$$\frac{1}{50} + \frac{1}{100} + \frac{1}{200} = 0.035 \qquad (27)$$

Where a value of 1.0 indicates end of component life. The new usage factor is used to update the output database 66 which is used for output and display. The above method of computation of stress intensity range 304 and fatigue usage 306 is typical and could be simplified depending on the situation at any given plant. Additional information on stress intensity range calculation and fatigue calculation can be found in the American Society of Mechanical Engineers Boiler and Pressure Vessel Code Section III, Subsection NB, 1983 Edition, incorporated by reference herein.

The stress amplitudes and usage factors, along with transient parameter information after global to local transformation, are stored in an output database 66 which can be accessed by personnel at the plant, using peripheral equipment 14, such as the cathode ray tube 42, printer 44, or plotter 46. The engineers can now use the information to make decisions regarding plant component maintenance, repair, replacement and life extension.

To determine transient thermal stress, the superposition principle is used which states that the stress acting on a component is the sum of the individual stresses acting on the component separately. For example, consider a beam subjected to two mechanical loads. At any location on the beam, the displacement, and indirectly the stress, is the sum of the displacements (stresses) caused by each of the loads separately. The same principle is being applied in the present invention except that temperature distributions are the load mechanisms and the location of the stress and the time are independent variables. For example, consider initially a plate with zero stress at an ambient temperature T. Assume that at the beginning of an analysis, a temperature change of $\Delta T$, is applied to the plate for a period of time $\Delta t_1$. Stress will be induced in the plate as a result of the temperature change. If, in a subsequent time interval $\Delta t_2$, the plate is given another temperature change $\Delta T_2$, additional stresses will be induced. The stress at the end of the second time interval $t_2 = \Delta t_1 + \Delta t_2$ is an accumulation (sum) of the first and second intervals. This procedure can be applied to any time period $t_n$ where $t_n = \Delta t_1 + \Delta t_2 \ldots \Delta t_n$. When $\Delta t_i$ approaches zero both the time and temperature change become continuous and the stress at any one time is given by the transfer function of equation 28 below. The temperature mentioned above is the externally applied temperature (the excitation temperature) that will cause stress changes in the plate. In this invention, the temperature is that of the fluid in contact with the surface of the mechanical component. If the temperature is essentially non-spatially dependent, as is the case in nuclear power fluid carrying devices, but is only time dependent, the method described above is sufficient to calculate the stress at any point on the plate. If a situation is encountered where the temperature is also spatially dependent, the spatial interaction can be taken into account by double summations of equation 28 with respect to both time and location.

The stress is determined in accordance with the following:

$$\sigma_{ij}(x,y,t) = f(o) Q_{ij}(x,y,t) + \int_0^t \frac{df(t_1)}{dt_1} Q_{ij}(s,y, t - t_1) dt_1 \qquad (28)$$

where $Q_{ij}$ is the stress response to the unit step function (f) and is called the kernel. Equation (28) is known as Duhamel's integral and additional discussion concerning this integral can be obtained in Hildebrand, *Advanced Calculus for Applications*, Prentice-Hall, Englewood Cliff, N.J., 1976, incorporated by reference herein. As an alternative, Greens function, as described in Courant and Hilber, *Methods of Mathematical Physics*, First Edition, Interscience Publishers, New York, 1937, also incorporated by reference herein can be used to calculate transient thermal stress. Additional information on calculations of thermal stress also incorporated by reference herein are: Carslow and Jaeger, *Conduction of Heat in Solids*, 2d Ed. Oxford University Press, 1959; and Boley and Weiner, *Theory of Thermal Stress*, John Wiley & Sons, Inc., 1960.

Figure 13:
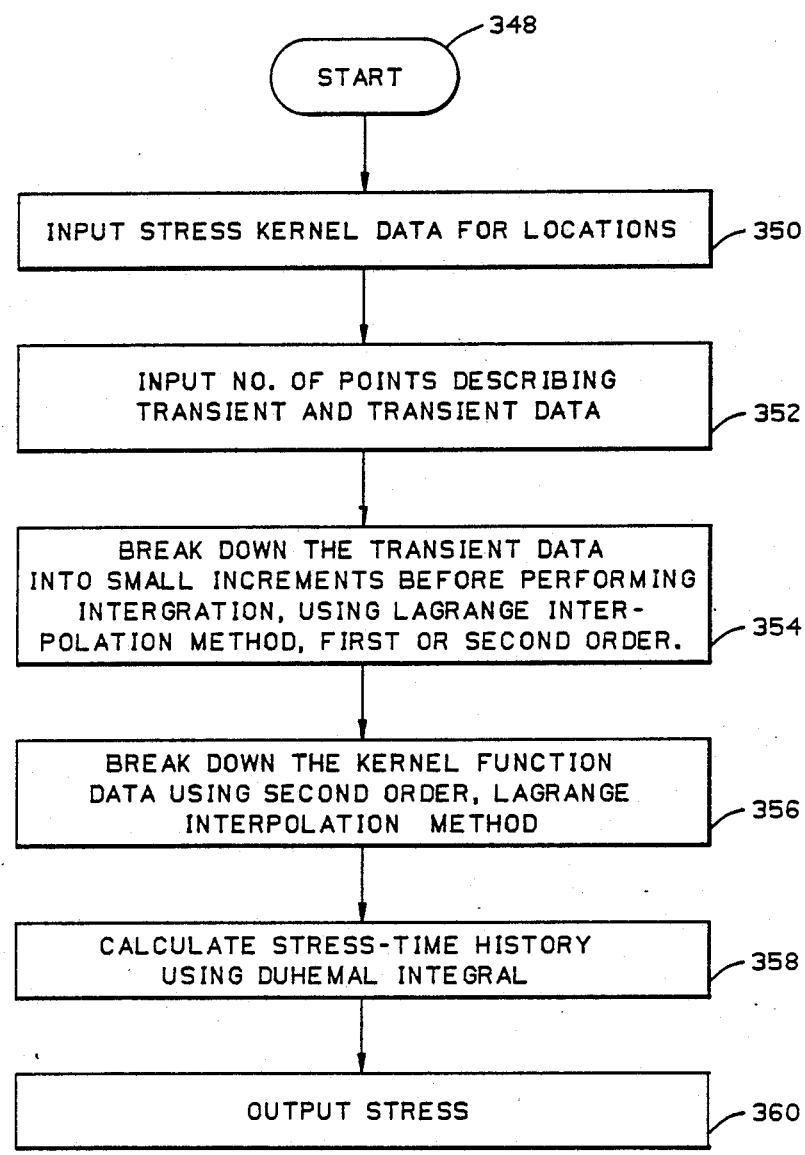
FIG. 13 illustrates the process of obtaining transient thermal stress.
Figure 14:
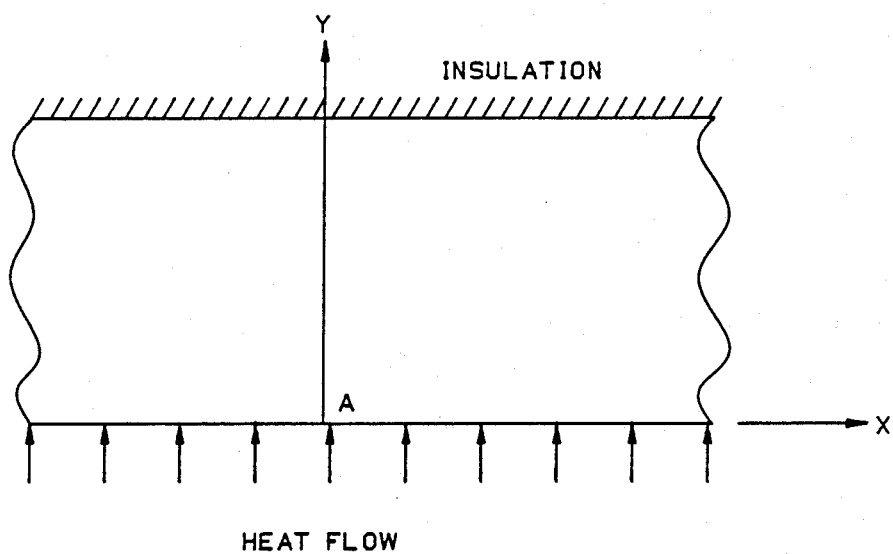
FIG. 14 is an example component for transient thermal stress calculation.

The process for obtaining the stress at each location is illustrated in FIG. 13. The kernel data 350 is input from the input data base 60. The kernel data can be calculated at plant design time or later if the plant is already in service by doing a well-known finite element stress analysis on the mechanical component of interest. For example, assume that the kernel data in table 1 below is input for a boiler plate, as illustrated in FIG. 14 and the stress is desired at point A.

TABLE 1

| Time (sec) | Q, Location A (psi) |
|---|---|
| 0.0 | 0.00 |
| 0.5 | −115.00 |
| 1.0 | −129.02 |
| 3.0 | −143.00 |
| 5.0 | −140.03 |
| 10.0 | −121.16 |
| 20.0 | −84.77 |
| 50.0 | −28.53 |
| 100.0 | −4.73 |

Figure 15:
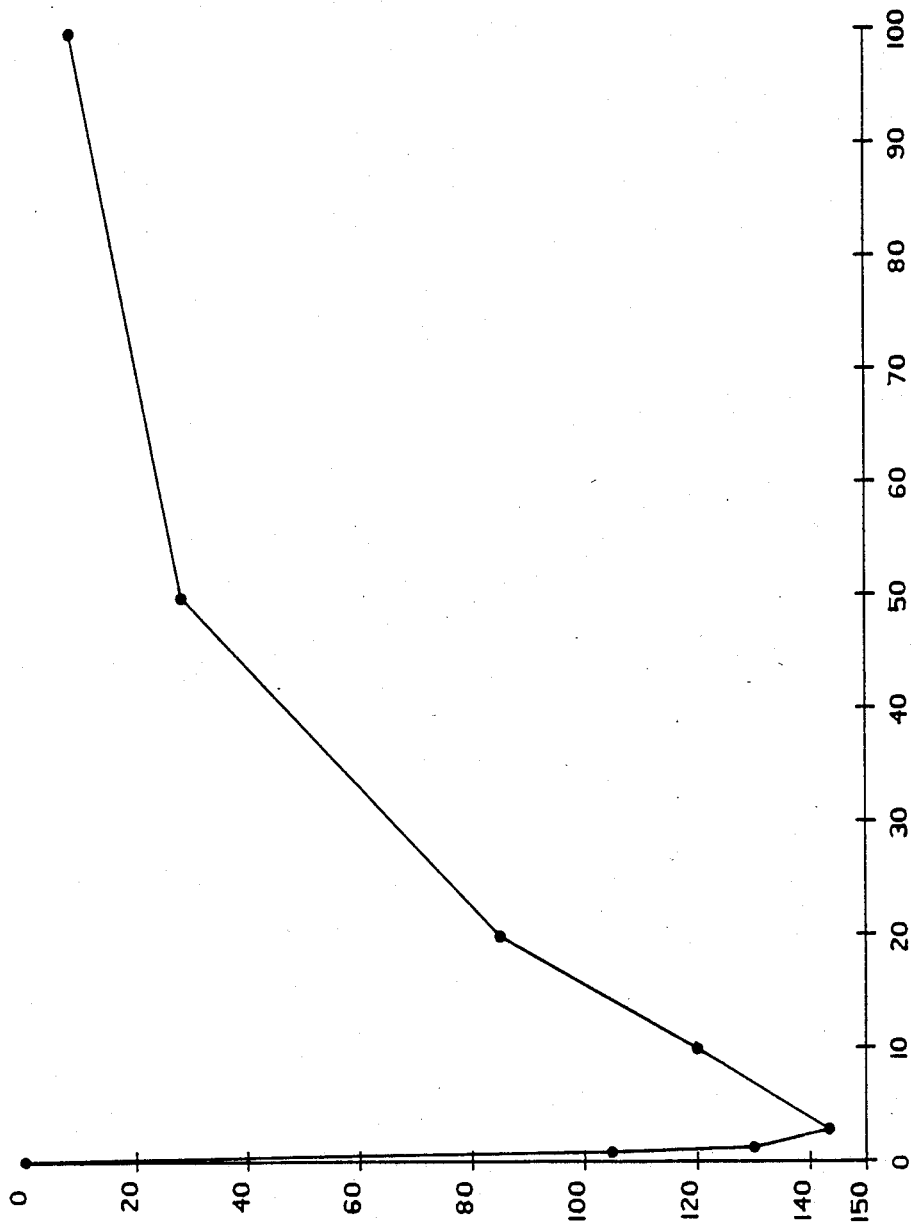
FIG. 15 is a transient example.

The kernel data depicted in table 1 and illustrated as a curve in FIG. 15 is obtained at the component design and testing stage and represents the response of the component to a step temperature transient where the temperature T of the fluid at point A in contact with the plate is changed from T=0 to T=1. A finite element temperature/stress analysis is performed and the kernel function is the stress solution caused by the sudden temperature change. The kernel or transfer function takes into account not only the shape and dimensions of the component but also the properties of the material from which the component is made.

Next, the transient data and number of points is input 352 (FIG. 13) from the transient parameter database 64. For example, assume that the transient data, in Table 2 below,

TABLE 2

| Time (sec) | Temp (°F.) |
|---|---|
| 0 | 500 |

TABLE 2-continued

Figure 16:
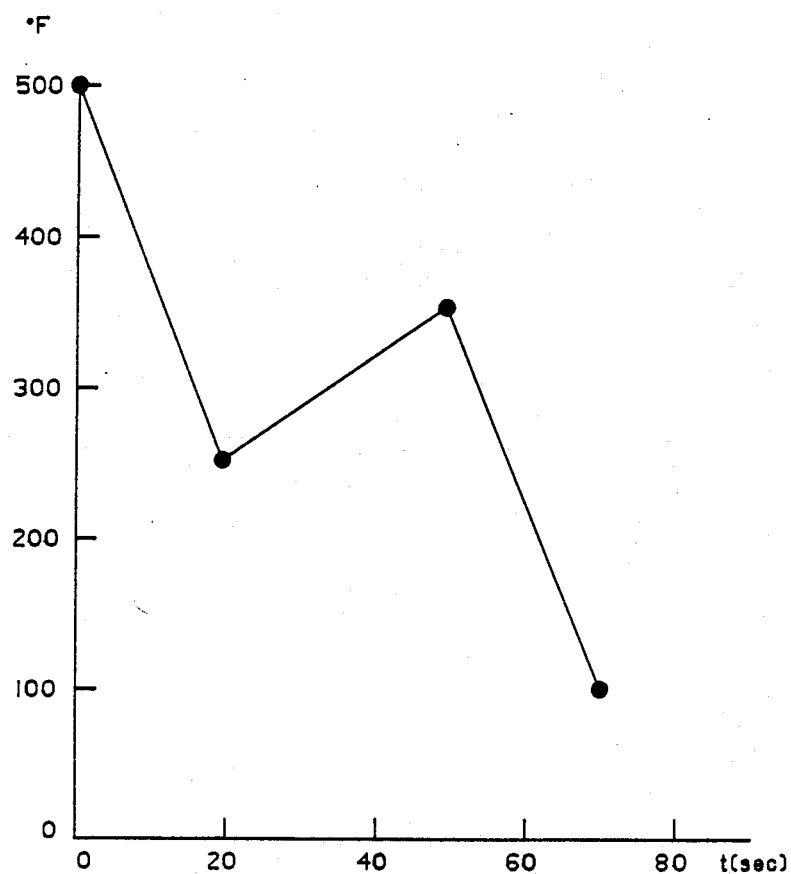
FIG. 16 is a transient example.

| Time (sec) | Temp (°F.) |
| --- | --- |
| 20 | 250 |
| 50 | 350 |
| 70 | 100 | is input, where the transient is illustrated by FIG. 16. Then the time scale and data points from the transient and kernel must be correlated. That is, each point in the kernel must have a corresponding point in the transient. That is accomplished by interpolating between kernel points 354 and transient points 356 using the same time step t.

$$T = \frac{(t - t_1)(t - t_2)}{(t_0 - t_1)(t_0 - t_2)} T_0 + \frac{(t - t_0)(t - t_2)}{(t_1 - t_0)(t_1 - t_2)} T_1 + \quad (29)$$

$$\frac{(t - t_0)(t - t_1)}{(t_2 - t_0)(t_2 - t_1)} T_2 \quad (29)$$

where t=time, T=temperature and the subscripts 0, 1, 2 denote the data points of the input time-temperature data.

The output is a series of temperature data at the boundary points of each small segment along the time frame. For example, the temperature at time 5.0 seconds is 438° F., while the temperature of time 10.0 seconds is 375° F. for the example of tables 1 and 2.

Next, the stress is calculated 358 for the transient using the following equation for the Duhamel integral:

$$\text{Stress} = \sum_{i=0}^{n} Q(t - T_i)(T_{i+1} - T) \quad (30)$$

where $T_i = \frac{t_{i+1} + t_i}{2}$, t equals time,

T equals temperature and Q equals the kernel function. Equation 30 integrates the stress response to a unit temperature input multiplied by the actual temperature input.

The calculations using the data of tables 1 and 2 would result in the stress set forth below in table 3.

TABLE 3

| Time (sec) | X (psi) |
| --- | --- |
| 20. | 29302.4 |
| 50. | 823.3 |
| 70. | 24248.1 |

These stresses are, then output to the next processing stages (302-306) in which the component usage factor is determined.

The many features and advantages of the invention are apparent from the detailed specification and thus, it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling within the scope of the invention.

We claim:

1. A fatigue cycle monitoring method using a sensor for monitoring a mechanical component, said method comprising the steps of:
   (a) sampling a sensor signal from the sensor and detecting a transient;
   (b) producing a compressed transient from the sensor signal after the transient is detected in the sensor signal; and
   (c) computing fatigue on the component from the compressed transient.

2. A method as recited in claim 1, wherein step (a) comprises the steps of:
   (a1) comparing the sensor signal to limit values of a first threshold range said threshold range set relative to a steady state like value of the sensor signal;
   (a2) sampling at a sampling rate and storing sensor samples in a storage at a first storage rate if the sensor signal is within the first threshold range; and
   (a3) sampling at the sampling rate and storing sensor signal samples in the storage at a second storage rate higher than the first storage rate if the sensor signal is equal to or outside the first threshold range limit values, whereby the transient is detected.

3. A method as recited in claim 2, wherein step (a3) includes the steps of:
   (i) continuing to store at the second storage rate until the sensor signal has been within the first threshold range limit values for a predetermined period; and
   (ii) returning to step (a1) when the sensor signal has been within the first threshold range limit values for the predetermined period.

4. A method as recited in claim 2, wherein step (b) comprises:
   (b1) storing the sensor signal samples as transient sensor samples when the current sensor signal ample is different from a stored sample by the value of the difference between second threshold range limit values; and
   (b2) determining at least the minimum and maximum sensor signal samples for each transient by comparing the stored signal samples and storing at least the minimum and maximum sensor signal samples, whereby the transient is compressed.

5. A method as recited in claim 2, wherein step (b) comprises the steps of:
   (b1) comparing the stored sensor samples stored at the second storage rate and storing a transient sensor sample in the storage when successive sensor signal samples are outside second threshold range limit values; and
   (b2) comparing the stored sensor signal samples stored at the second storage rate and storing the maximum and minimum sensor signal samples in the storage when a maximum or minimum are detected, respectively, whereby the transient is compressed.

6. A method as recited in claim 5, wherein steps (b1) and (b2) comprise the steps of:
   (i) storing and designating a previous sensor signal sample as a base transient sample;
   (ii) comparing one of the stored sensor signal samples to the base transient sample, storing and designating the compared sensor signal sample as a new base transient sample when the compared sensor signal sample is different from the base transient sample by the value of the difference between the second threshold limit values; and (iii) comparing the stored sensor signal samples, starting with the base transient sample, to each other and storing a maximum or minimum when a peak or a valley is detected in the stored sensor signal samples, respectively.

7. A method as recited in claim 1, wherein the compressed transient includes monitored component pressure and temperature sensor samples and step (c) comprises the steps of:
   (c1) calculating component stress from the pressure and temperature transient sensor samples;
   ($\sigma$2) determining a stress intensity range from the component stress; and
   ($\sigma$3) producing a component usage factor from the stress intensity range indicating the fatigue on the component with the component usage factor.

8. A method as recited in claim 7, wherein the storage has predetermined component load stresses previously stored therein and step (c1) comprises the steps of:
   (i) computing component pressure stress from pressure transient sensor samples;
   (ii) computing general thermal component stress;
   (iii) computing transient thermal component stress from temperature transient sensor samples;
   (iv) obtaining the predetermined component load stresses from the storage; and
   (v) adding the stresses.

9. A method as recited in claim 8, wherein step (iii) includes performing Duhamels integral to calculate the transient thermal component stress using the temperature transient sensor samples.

10. A fatigue cycle monitoring method for sensor monitoring a mechanical component in a nuclear power plant, said method comprising the steps of:
   (a) sampling a sensor signal from the sensor at a sampling rate;
   (b) checking integrity of the sensor signal;
   (c) comparing the sensor signal to first threshold range limit values;
   (d) storing sensor samples in a storage at a first storage rate if the sensor signal is within the first threshold range limit values;
   (e) storing sensor signal samples in the storage at a second storage rate higher than said first storage rate if the sensor signal is equal to or outside the first threshold range limit values;
   (f) continuing to store at the second storage rate until the sensor signal has been within the first threshold range limit values for a predetermined period;
   (g) comparing the stored sensor samples stored at the second rate to second threshold range limit values and storing a transient sensor sample in the storage when successive sensor signal samples are outside the second threshold range limit values;
   (h) comparing the stored sensor signal samples stored at the second storage rate and storing the maximum and minimum sensor signal samples in the storage when a maximum or minimum are detected, respectively;
   (i) computing component pressure stress from pressure transient sensor samples;
   (j) computing general thermal component stress;
   (k) computing transient thermal component stress by performing Duhamels integral on temperature transient sensor samples;
   (l) obtaining predetermined load stresses from the storage;
   (m) adding the component pressure stress, the general thermal component stress, the transient thermal component stress and the predetermined load stresses;
   (n) determining a stress intensity range from the added stresses; and
   (o) producing a component usage factor from the stress intensity range indicating the fatigue on the component with the component usage factor.

11. A cycle monitoring apparatus for a sensor monitoring a component, said apparatus comprising:
   sampling means for sampling a sensor signal producing sensor signal samples and detecting a transient in the sensor signal samples;
   compression means for compressing the sensor signal samples into a compressed transient after the transient is detected; and
   fatigue determination means for determining component fatigue from the compressed transient.

12. An apparatus as recited in claim 11, wherein said compression means includes means for comparing the sensor signal to threshold limit values and storing the sensor signal as a transient sample each time the sensor signal is outside the threshold limit values surrounding a previously-stored transient sample.

13. An apparatus as recited in claim 12, wherein said fatigue determination means includes means for determining stresses on the component, means for combining the stresses on the component, means for determining a stress intensity range from the combined stressed and means for producing a component usage factor from the stress intensity range indicating the fatigue on the component with the component usage factor.

* * * * *